United States Patent [19]
Cooley

[11] Patent Number: 6,150,976
[45] Date of Patent: Nov. 21, 2000

[54] SYNTHESIS OF OVERLAPPING CHIRP WAVEFORMS

[75] Inventor: James R. Cooley, Hunt Valley, Md.

[73] Assignee: AAI Corporation, Hunt Valley, Md.

[21] Appl. No.: 09/132,570

[22] Filed: Aug. 12, 1998

[51] Int. Cl.[7] ............................... G01S 7/40; G09B 9/00
[52] U.S. Cl. ..................... 342/169; 342/165; 342/170; 342/171; 342/175; 342/194; 342/195; 434/2; 434/6
[58] Field of Search ...................... 342/165–175, 342/192–197; 434/1–10; 395/500.34

[56] References Cited

U.S. PATENT DOCUMENTS

| | | |
|---|---|---|
| 3,654,450 | 4/1972 | Webb . |
| 3,822,380 | 7/1974 | Forgione . |
| 4,198,762 | 4/1980 | Lamasney et al. ........................ 434/3 |
| 4,715,046 | 12/1987 | True, III et al. . |
| 4,780,084 | 10/1988 | Donovan .................................. 434/2 |
| 4,890,249 | 12/1989 | Yen .................................. 395/500.34 |
| 5,135,397 | 8/1992 | Yen ........................................... 434/2 |
| 5,384,572 | 1/1995 | Michaels et al. . |
| 5,457,463 | 10/1995 | Vencil et al. . |
| 5,469,479 | 11/1995 | Chang et al. . |

FOREIGN PATENT DOCUMENTS

0005127 A2  10/1979  European Pat. Off. .......... H03D 7/16

OTHER PUBLICATIONS

Cronyn et al., "Universal Radar Moving Target Transponder" Proceedings of the National Radar Conference, US, New York, IEEE, 1996, pp. 238–242.

Primary Examiner—Bernarr E. Gregory
Attorney, Agent, or Firm—Venable; Catherine A. Ferguson

[57] ABSTRACT

A digital radar landmass simulator (DRLMS) used for stimulation testing pulse radars, wherein the DRLMS operates by synthesizing time-overlapping chirp waveforms using finite impulse response filters. The DRLMS, thus, effectively generates many overlapping complex pulse signals from many radar reflectors representing a semi-infinite continuum of closely spaced targets. The DRLMS also allows the insertion/injection of the effects of Doppler shift and jamming into the synthesized modulated signal.

45 Claims, 30 Drawing Sheets

6,150,976

SYNTHESIS OF OVERLAPPING CHIRP WAVEFORMS

BACKGROUND OF THE INVENTION

1. Field of the Invention

The present invention relates generally to digital radar landmass simulators and, more particularly, to a system and method for synthesizing overlapping chirp waveforms for digital radar landmass simulators.

2. Statement of the Prior Art

Modern pulse compression radars utilize surface acoustic wave (SAW) filter technology in their exciter/receiver least replaceable units (LRUs) to generate expanded pulse waveforms for transmission. The same or similar SAW filters are then used to compress the received return pulses. This technology enables the radar to substantially improve its signal to noise ratio without sacrificing range resolution. It creates extreme difficulty for simulation and test equipment, however, since the return from multiple discrete targets overlap in time.

The coincident timing of radar returns implies that the simulation equipment must be capable of generating multiple, individually phased waveforms in order to simulate closely spaced targets. This is no simple task, requiring the summation of complex analog waveforms for each independent target.

The problem faced in adapting digital radar landmass simulators (DRLMSs) to pulse compression radars is that the land mass simulation effectively requires a semi-infinite continuum of closely spaced targets. It is not practical to simulate this continuum by processing the expanded waveforms; there are simply too many time-overlapping signals to create. Until recently, there was no option but to embed, into the test equipment, a SAW expansion filter identical to the ones in the radar. This is, in fact, the industry standard approach.

SAW waveform expansion/compression filters are very expensive, however, and each compression mode of each radar is likely to have a different SAW. In order to cover a wide variety of target radars, the existing technology requires an expensive proliferation of dedicated hardware.

A Frequency Agile Signal Generator for Emulating Communications Environments described in the prior art is used to generate simulated communication signals which are inherently different from the simulated radar signals produced in the Chirp/Doppler IF Generator. The communication signals are continuous in nature and come from only one source and are frequency agile. The radar signals are pulse signals and come from many radar reflectors and have a base frequency modulated by the Doppler effect. The central element in the Chirp/Doppler IF Generator, the waveform generator, is used to overlap many complex pulse signals from many radar reflectors.

A prior art Digital Signal Generator teaches a circuit that is the basic accumulator circuit used in commercially available Numerically Controlled Oscillators (NCOs), except that commercial NCOs add a sine or cosine lookup table implemented in a ROM to provide a sine wave rather than the sawtooth wave described in the invention. The technique is known as Direct Digital Synthesis (DDS) and is in wide use in the industry. The Chirp/Doppler IF Generator does use a number of NCOs in its implementation, but the technique used by the NCOs is incidental to the design of the Chirp/Doppler IF Generator. That is, the Chirp/Doppler IF Generator could be designed without NCOs and still function.

A Digitally Controlled Signal Generator uses a recirculating shift register to produce one arbitrary waveform. In contradistinction, the Chirp/Doppler IF Generator uses digital filtering techniques to generate synthetic radar signals that include the effect of many overlapping complex waveforms.

SUMMARY OF THE INVENTION

The present invention solves the problem of simulating a semi-infinite continuum of closely spaced targets represented by time-overlapping signals with a technique for simulating the SAW expansion/compression waveforms using low cost, readily available digital signal processing (DSP) chips. This permits the necessary waveforms to be generated without a SAW. Instead of embedding an actual SAW in the simulation equipment for each type of radar, the SAW waveforms can be simulated with a low cost chipset, and can be re-configured for different radars by simply re-programming the DSP coefficients.

Duplicating the complex chirp (pulse compression) waveforms from a SAW filter is no trivial task. In response to an impulse stimulus, a SAW generates frequency modulated output that continuously slews in frequency. The slew may be either up or down in frequency, may be either linear or nonlinear, and typically has a gain-bandwidth product that is specific to a particular SAW device. The present invention solves this problem by taking advantage of the architecture of finite impulse response (FIR) filter processing chips. The structure of these digital convolution processors allow them to be used to generate an arbitrary impulse response. Instead of using the chips to filter a digital data stream (their intended application), they are configured as impulse response synthesizers, applying a single impulse stimulus and using the filter coefficients to synthesize the desired response.

It is an object of the present invention to provide a low cost reconfigurable solution to synthesizing/simulating SAW expansion/compression waveforms.

It is further an object of the present invention to provide pulse compression waveform synthesis/simulation that is adaptable to both linear and non-linear chirps as well as Barker Codes and other autocorrelating phase sequences.

The present invention has immediate application in the generic naval stimulation/simulation (GNSS) system. It may also find a wide range of applications for radar test equipment (e.g., for weather radar systems and commercial DRLMS) as well as a wide range of equipment for testing/simulation of other electromagnetic and/or optical signals.

DETAILED DESCRIPTION OF INVENTION

Figure 1:
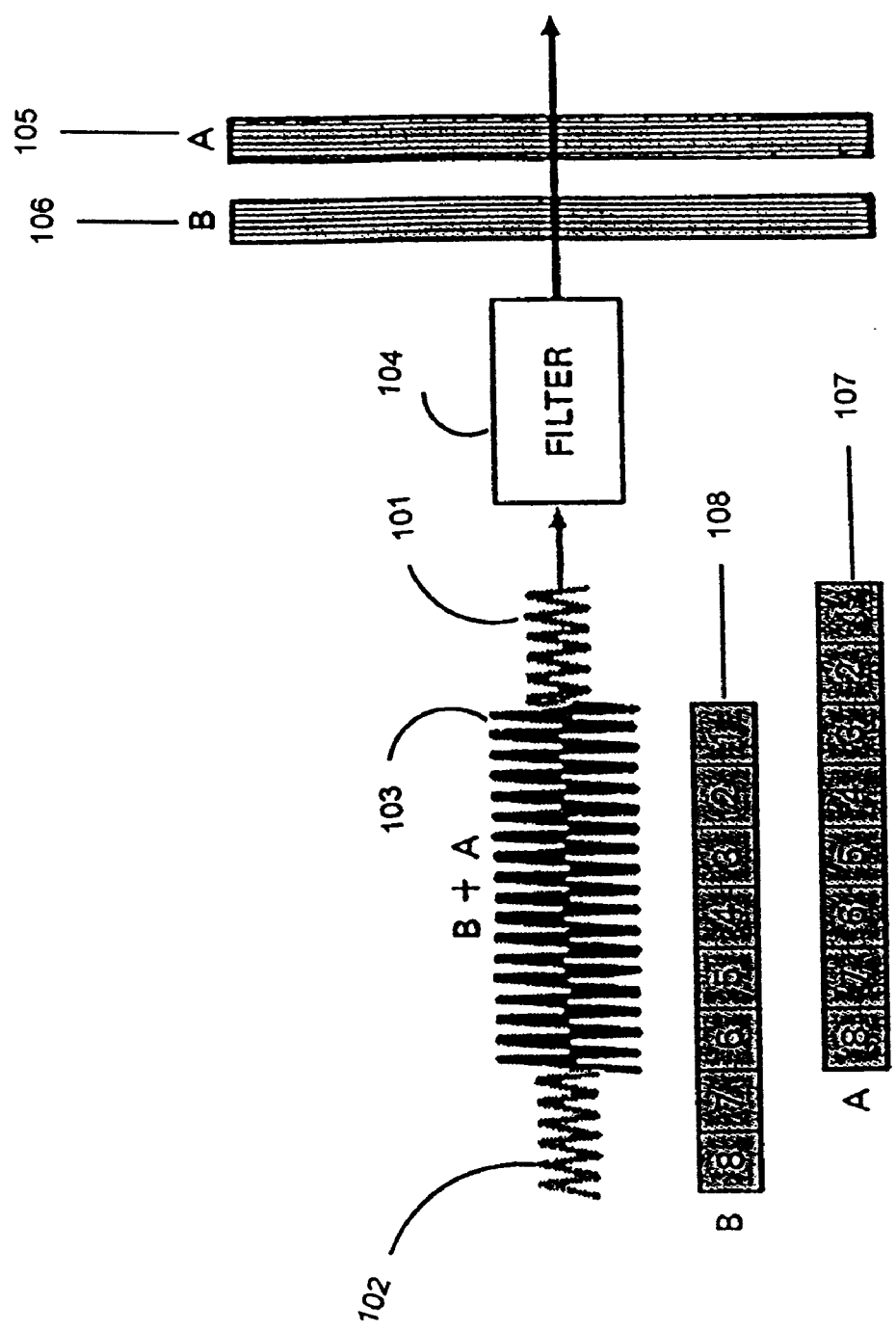
FIG. 1 depicts the echoes from closely spaced targets, A and B, which are overlapping but, because of coding, can be separated in the output of a filter.

The problem is best illustrated by FIG. 1 which shows only two overlapping signals (signal A denoted in its analog form by 101 and in its digital form by 107 and signal B denoted in its analog form by 102 and its digital form by 108. The radar uses bandpass filters 104 to separate the signals 105 and 106. The problem for a stimulation/simulation tool is to generate the merged echoes 103. The problem is not the simple case of two echoes as illustrated in FIG. 1 but rather the echoes from a semi-infinite continuum of closely spaced target echoes.

Chirp/Doppler IF Generator Signal Generation
(Chirp and Doppler)

Figure 2:
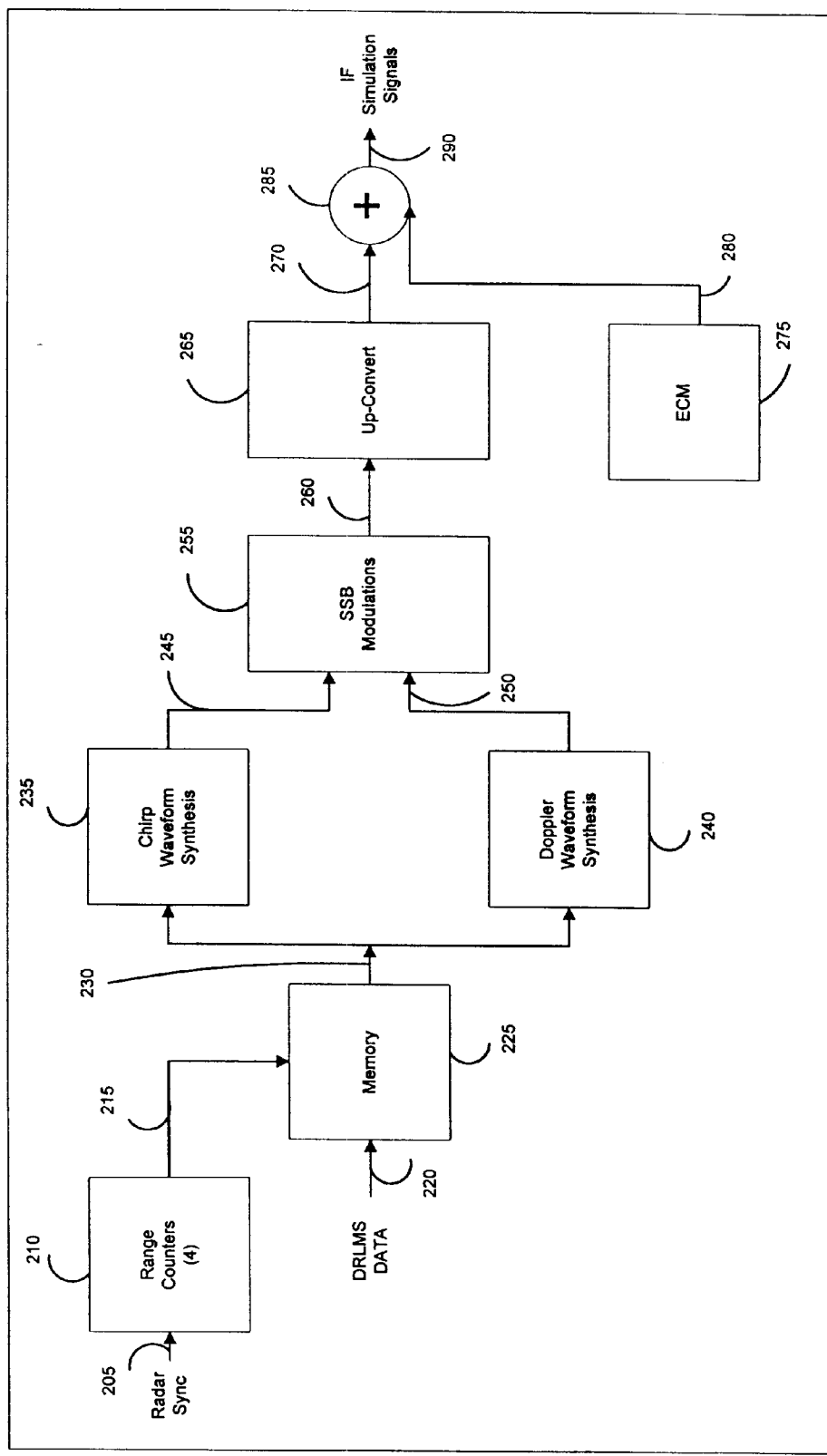
FIG. 2 is a simplified functional flow of the overlapping chirp/Doppler waveform process.

FIG. 2 is a simplified functional flow of the overlapping chirp/Doppler waveform synthesis process 200.

The radar sync signal 205 is supplied to the range counter unit 210 which generates the range counts 215 which are stored in the memory unit 225 and processed with the DRLMS data 220 to yield four signal strength values that have been time multiplexed together 230. This value 230 is used by the Doppler synthesizer 240 to add the effect of Doppler shift to the data.

The output of the Doppler synthesizer 240 is composed of the in phase Doppler component and the quadrature Doppler component, which together 250 may be selected by the SSB modulator 255. The signal strength value 230 is used by the chirp waveform synthesizer 235 to add chirp pulse compression modulation to the simulated radar signal. The output 245 of the chirp waveform synthesis 235 consists of both in phase and quadrature components of the generated waveforms. The generated waveforms have been resampled to increase the sample rate of the data to equal or closely approximate the clock rate of the SSB modulator 255.

The SSB modulator 255 selects the in phase and quadrature components of either the Doppler synthesis 240 or the chirp waveform synthesis 235 based on whether the radar is in long range or short range modes.

The output 260 of the SSB modulator 255 is an analog carrier signal at the frequency programmed by the numerically controlled oscillator (NCO) with modulations from the Doppler synthesizer 240 and the chirp waveform synthesizer 235 that have been filtered to remove the undesired high frequency components that resulted from the digital signal processing.

The up-converter 265 accepts the output 260 of the SSB modualtor 255 and translates the signal up to equal the IF frequency of the radar being simulated by mixing the output 260 of the SSB modualtor 255 with the doubled signal from a NCO. This output signal 270 has all the components of the simulation except for the effects of jamming.

The ECM unit 275 provides simulation for radars that have one or more coherent side lobe canceller (CSLC) channels and it further provides a coherent jamming source. The main output 280 of the ECM unit 275 is added 285 to the output 270 of the up-converter 265 to yield the simulated radar signal 290.

The chirp/Doppler intermediate frequency (IF) generator is a single slot VME circuit card that is designed to provide a stimulation signal for pulse radars that require Doppler or pulse compression (chirp) modulation. This circuit card is also designed to provide the range-redundant signal required, in particular, by the AN/SPS-49A. The stimulation signal is produced at the radar's IF on the chirp/Doppler IF generator and is converted to radio frequency (RF) in another part of the GNSS as necessary. This circuit card can also be used to synthesize a stimulation signal for pulse radars that do not require Doppler or pulse compression modulation and are not range-redundant.

Figure 3:
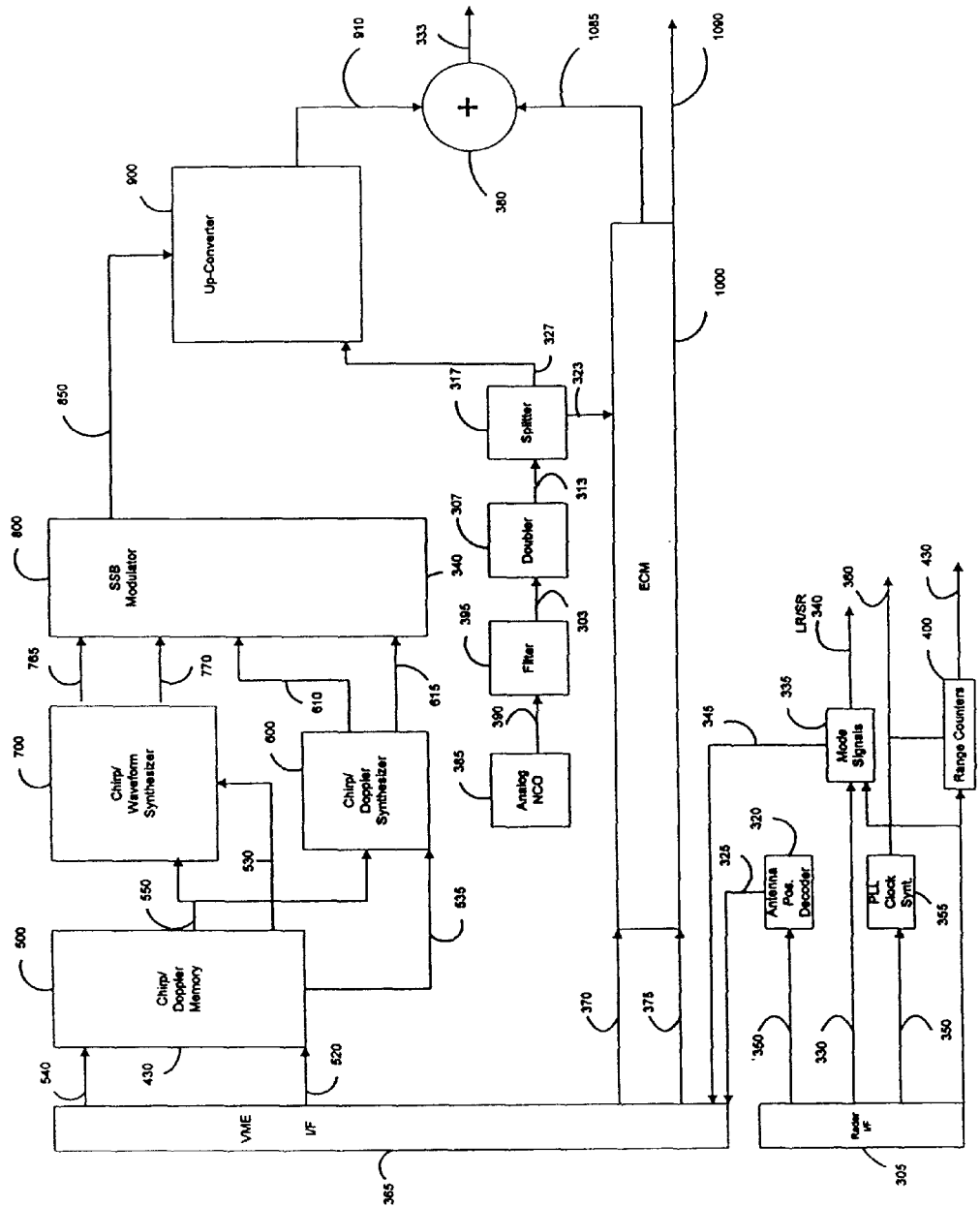
FIG. 3 is an overview of the design of the chirp/Doppler IF generator.

FIG. 3 is an overview of the design of the chirp/Doppler IF generator 300. The main units are the VME interface 365, the range counter 400, the chirp/Doppler memory 500, the chirp/waveform synthesizer 700, the Doppler synthesizer 600, the electronic counter measures (ECM) unit 1000, the SSB modualtor 800 and the up-converter 900.

All of the clock signals on the chirp/Doppler IF generator are developed in a programmable clock generator 355 that is phase-locked to the radar coherent homodyne (COHO) signal 350 from the radar interface 305. This assures that any signals 360 developed on this board are coherent to the radar receiver.

This board also contains a converter 320 that accepts digital antenna motion signals from the radar interface and makes radar antenna position data 325 available to the DRLMS. The MK 23 TAS radar interface provides digital signals for antenna motion 310. These signals consist of an azimuth change pulse (ACP) and a bow crossing marker (BCM).

There is also an interface circuit 335 on this card designed to accept all of the radar mode data 330 that comes from the radar interface. All of this data 345 is passed to the software for use in the simulation and for data collection. The chirp/Doppler IF generator uses a long range/short range (LR/SR) signal 340 to select either pulse compression or Doppler mode.

Range counters 400 are used to control the generation of radar signals in radar real time. The range counters are set to zero and started by a radar sync 337 signal that comes from the radar system.

The local oscillator signal 327 is developed in an Analog Devices NCO 385 that includes a built-in D/A converter, the AD9850. The AD9850 is rated for clock frequencies up to 120 MHz, which enables this part to produce high fidelity signals up to 35 MHz. The output 390 of the NCO 385 is passed through a filter 395. The output 303 of the filter 395 is passed through a frequency doubler 307, effectively doubling the maximum frequency available to 70 MHz.

The signal from the NCO is programmed so that the output 313 from the doubler is at a frequency that is equal to the radar IF frequency plus the frequency of the signal from the SSB modulator. The signal 313 is split by the splitter 317 and used by both the up-converter 900 and the ECM 1000. One of the outputs from the splitter 317 is used in the Up-Converter 900, and the other 323 is used in the ECM. Both of these signals 327 and 323 are used in a frequency conversion process.

At this point, the signal is at the radar IF frequency and it contains all of the artifacts of the simulation except for the effects of jamming. The output maintains coherency with the radar COHO because the system clock for the chirp/Doppler IF generator is phase locked 355 to the radar COHO. The effects of simulated jamming are added to the simulated radar signal by the analog adder 380 before the signal 333 is sent off of the board. The ECM function 1000 is controlled from the software through two parameters, frequency 370, and pulse pattern 375.

Figure 4:
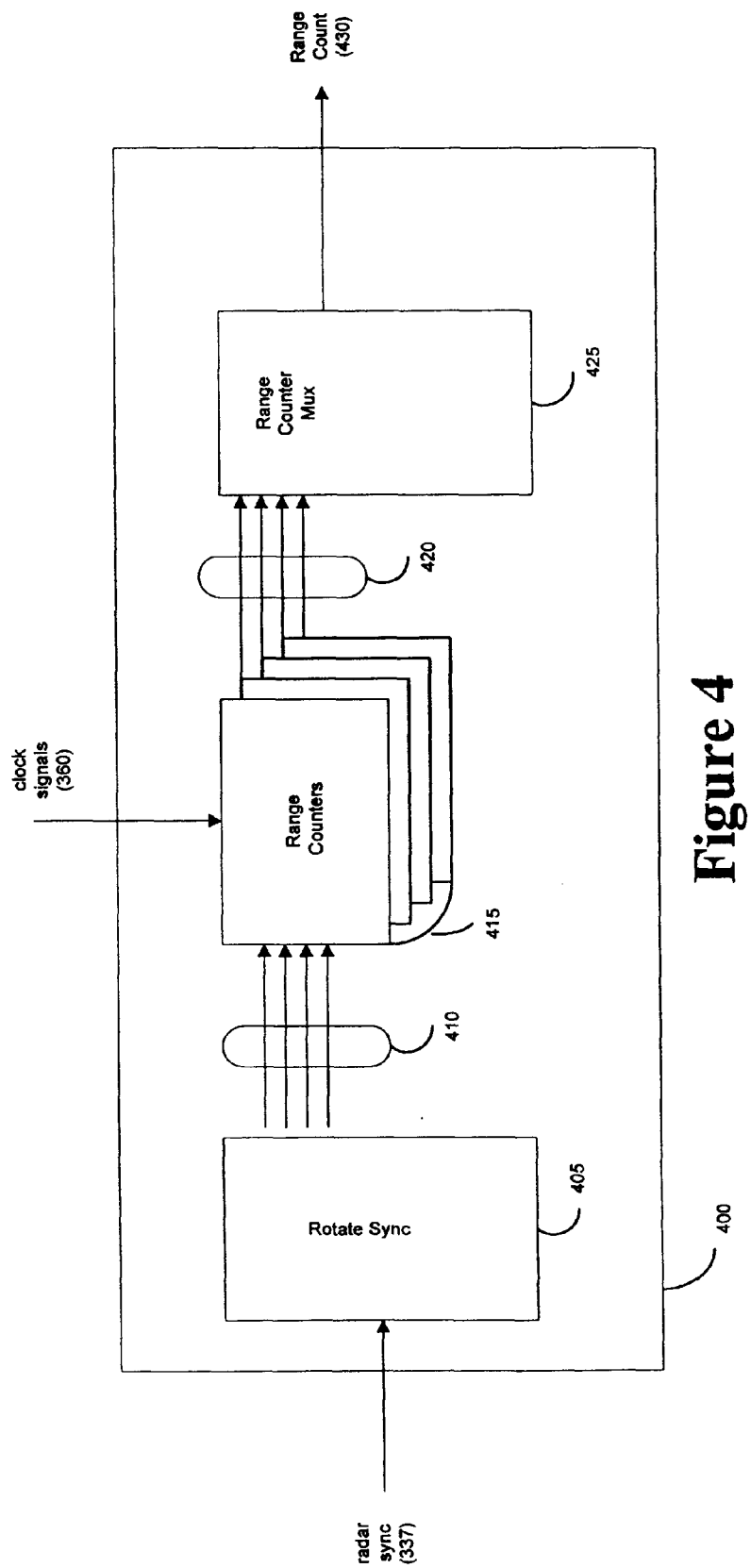
FIG. 4 shows the design of the chirp/Doppler range counter unit.

The range counter portion 400 of the chirp/Doppler IF generator is also shown in FIG. 4 and has four range counters 415 which each sequence through the range bins to process the range data. One range counter is necessary for most radars, however, as in the case of the AN/SPS-49A radar four range counters 415 are required to process ambiguous range data. If multiple range counters 415 are required then the radar sync signal is cycled among the range counters 415 by the rotate sync unit 405. Radar sync 337 is also used to coordinate the process for changing the portion of the Chirp/Doppler Memory 500 being used by the hardware to assure that a change does not occur in the middle of a radar sweep.

The rotate sync component 405 accepts a radar sync signal 337. The output 410 of the rotate sync component 405 is actually 4 sync signals 410 that are cycled to each of the required range counters 415. The range counters accept a coherent homodyne clock 360 phase locked to the radar. The operation of the range counters is more fully detailed in the subsection entitled chirp/Doppler range counters. The output 420 of the range counters 415 is accepted by the range counter multiplexer 425 which time multiplexes these signals onto a single address bus as the range count 430. The range count is subsequently available to the chirp/Doppler memory 500.

Figure 5:
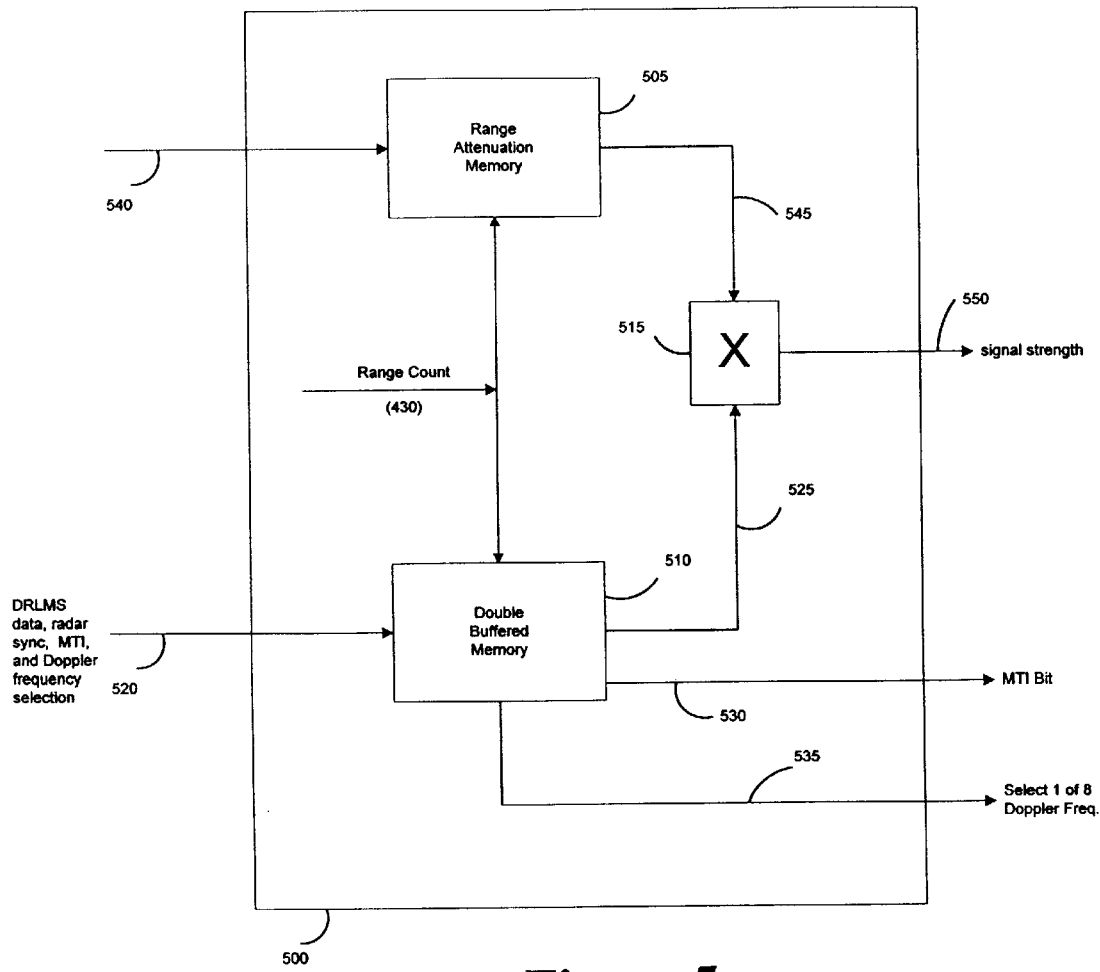
FIG. 5 illustrates the design of the chirp/Doppler memory.

The chirp/Doppler memory unit 500 is also shown as FIG. 5 and has three main components: a double buffered memory 510, a range attenuation memory 505, and a multiplier 515. The range count 430 is accepted by both the double buffered memory 510 and the range attenuation memory 505. The double buffered memory 510 also accepts DRLMS data, the radar sync signal, MTI, and Doppler frequency selection 520. Radar sync is used to initiate the exchange between halves of the double buffered memory 510 so that data from the double buffered memory 525, 530, and 535 is not interrupted during a read cycle. The double buffered memory 510 processes the data from half of the memory while the other half of the memory is being filled/loaded with data. The double buffered memory 510 further generates a moving target indicator bit 530 which is accepted by the chirp/waveform synthesizer 700 indicates whether or not the data in the range bin represents a moving or stationary target. The double buffered memory 510 further generates a signal 535 that selects one of the eight available simulated Doppler signals to be used for that range bin. The range attenuation memory 505 contains preloaded data 540 that represents the effect of distance on the simulated signal expressed as attenuation. This data is arranged by range bin and selected based on the range bin being processed and output 545 to the multiplier 515 and multiplied by the signal amplitude data 525 to yield four signal strength values time-multiplied onto one output 550, which is accepted by both the Doppler synthesizer 600 and the chirp/waveform synthesizer 700.

Figure 6:
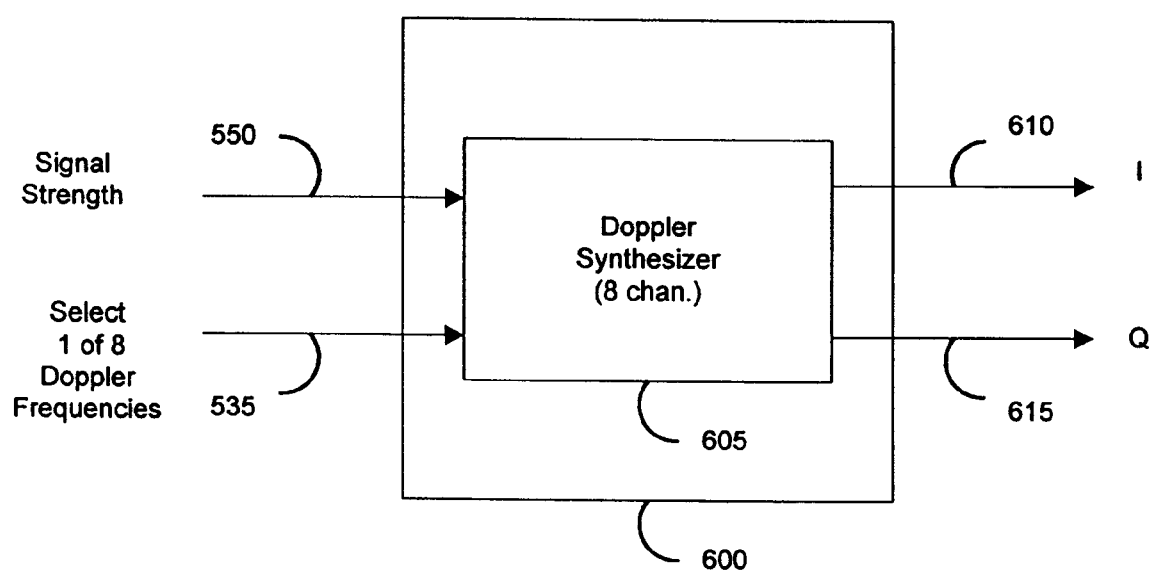
FIG. 6 depicts the design of the Doppler synthesizer.

The Doppler synthesizer 600 is also shown as FIG. 6 and adds the effect of Doppler shift to the data. The Doppler synthesizer 605 comprises eight Doppler signal generators detailed in the subsection entitled Doppler synthesis. The outputs of the Doppler synthesizers are an in phase Doppler component 610 and a quadrature Doppler component 615, both of which are accepted by the SSB modualtor 800.

Figure 7:
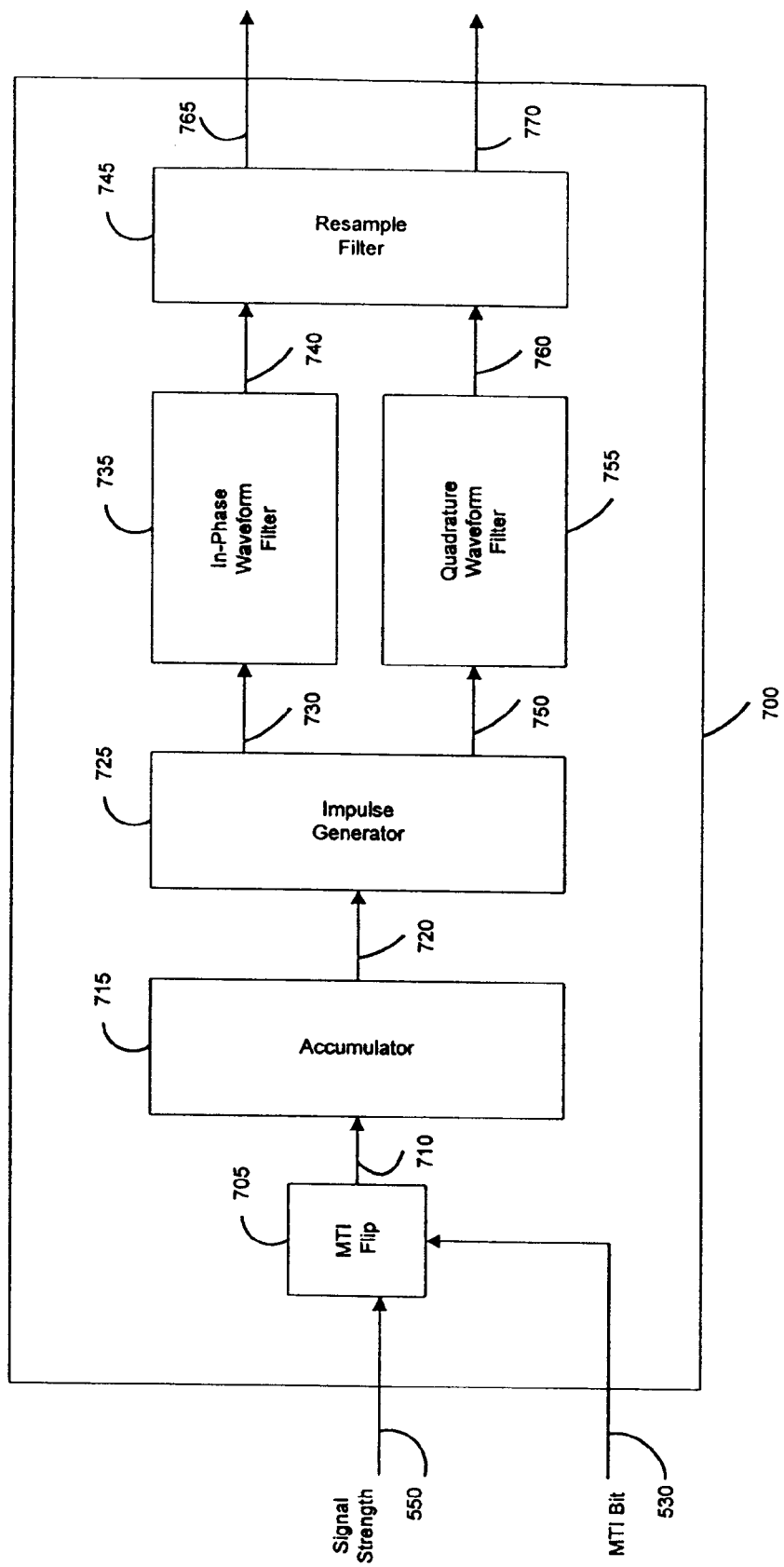
FIG. 7 is the design of the chirp/waveform synthesizer.

The chirp/waveform synthesizer 700, as shown in FIG. 7, adds chirp pulse compression modulation to the simulated radar signal. The MTI Flip 705 accepts the signal strength 550 and the MTI Bit 530 from the chirp/Doppler memory unit 500 and adds the effect of moving targets to the signal amplitude. This accomplished by adding phase shift to the simulated radar data if the target has been indicated as a moving target. By inverting (flipping/negating) the input to the waveform generator a 180° phase shift is generated. The output 710 of the MTI flip 705 is the simulated radar data adjusted for moving targets. The accumulator 715 accepts the four time multiplexed signal strength values 550 and adds them together to generate a single value 720 for each range bin. The output 720 of the accumulator 715 is accepted by the impulse generator 725 where the simulated radar signal is gated with a narrow, one-sample period pulse to form an impulse representation for use in waveform synthesis. The impulse representations of the signals 730 and 750 are input to two identical digital FIR filters 735 and 755 to generated the waveforms required by the SSB modualtor 800. One FIR filter 735 is programmed with an in phase waveform, and the other FIR filter 755 is programmed with the quadrature waveform. One waveform is the in phase component 740 and the other waveform is the quadrature component 760. The operation of the digital FIR filters is fully detailed in the subsection entitled waveform synthesis. The last step in waveform synthesis is to increase the sample rate of the data coming from the selector to equal the clock rate used in the SSB modualtor 800. This is accomplished when the resample filter 745 accepts the in phase 740 and quadrature components 760 of the signal which is resampled using digital lowpass filters (implemented with FIR filters). The output signals of the resample filter 745 are the resampled in phase component 765 of the simulated radar signal and quadrature component 770 of the simulated radar signal.

Figure 8:
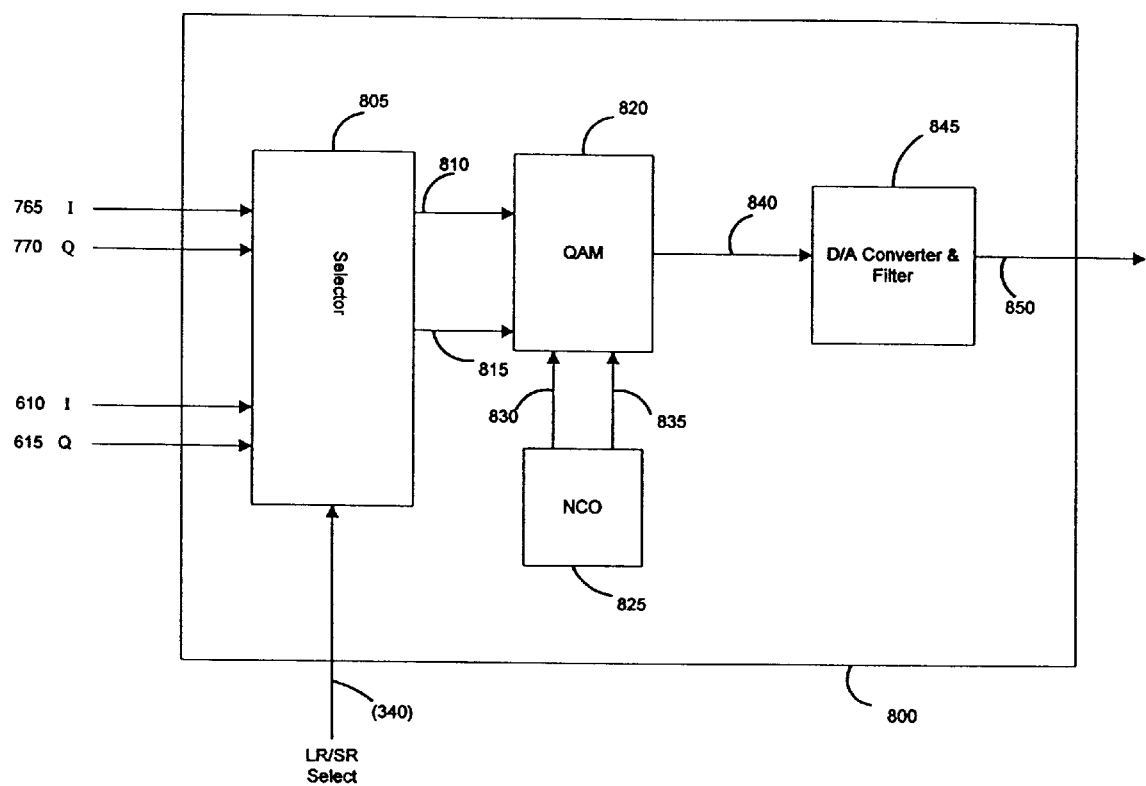
FIG. 8 illustrates the design of the SSB modulator.

The SSB modualtor 800, as shown in FIG. 8, consists of a selector 805, a QAM 820, a NCO 825 and a digital-to-analog (D/A) converter and filter combination 845. The selector 805 accepts in phase components 765 and 610 and quadrature components 770 and 615 of the simulated radar signal from either the Doppler synthesizer 600 or the chirp/waveform synthesizer 700 based on the radar mode LR/SR select 340 indicator. The QAM 820 accepts the in phase component 810 and quadrature component 815 selected by the selector 805 and produces a digitally modulated signal 840. This is accomplished by accepting a digitally synthesized carrier from the NCO 825. The digitally synthesized carrier is provided to the QAM 820 in both in phase 830 and quadrature versions 835. The digitally modulated signal 840 is processed by the D/A converter and filter combination 845 to yield a modulated carrier signal 850 at the frequency programmed into the NCO 825 with the modulations from the Doppler synthesizer 600 or the chirp/waveform generator 700 that has also been filtered to eliminate the undesired high frequency components.

Figure 9:
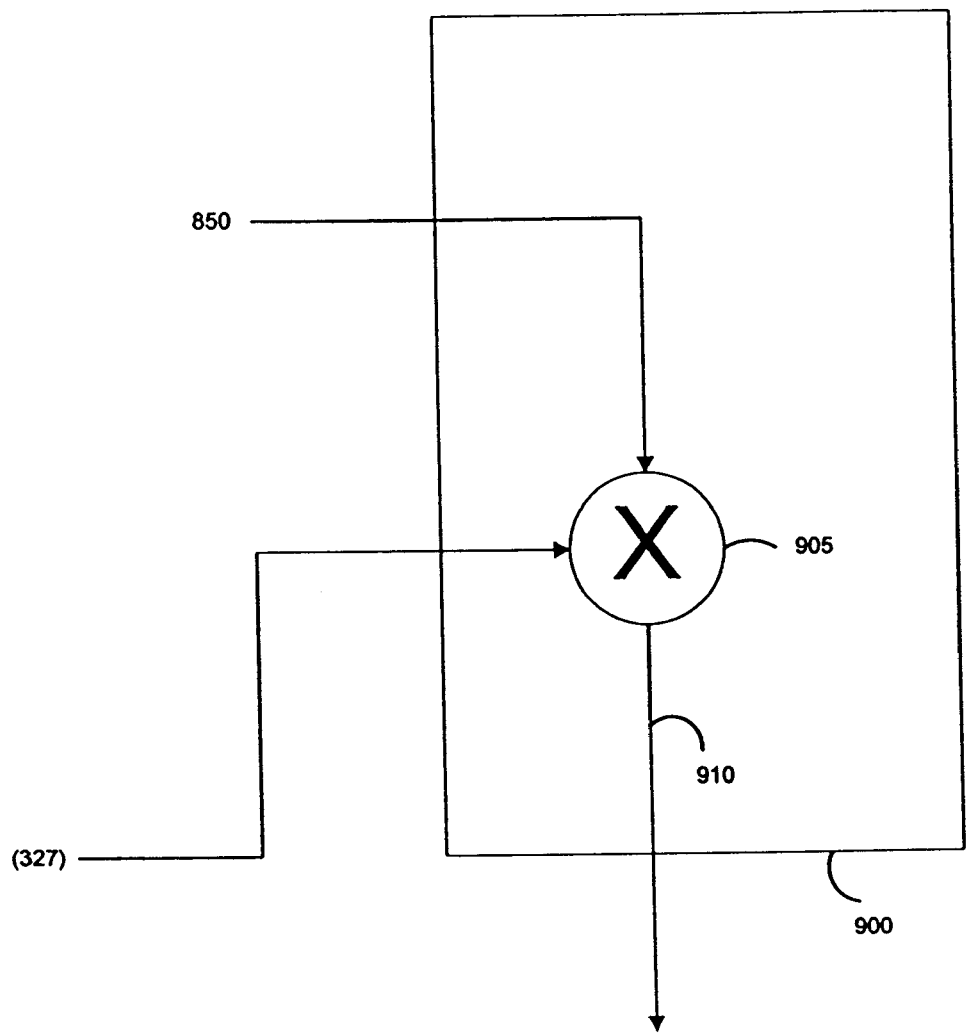
FIG. 9 shows the design of the up-converter.

The up-converter 900, as shown in FIG. 9, translates the signal 850 from the SSB modualtor 800 up to equal the IF frequency of the radar being simulated. This is accomplished by an analog mixer 905. The output 910 of the analog mixer contains all of the artifacts of the simulation except for the effects of jamming.

Figure 10:
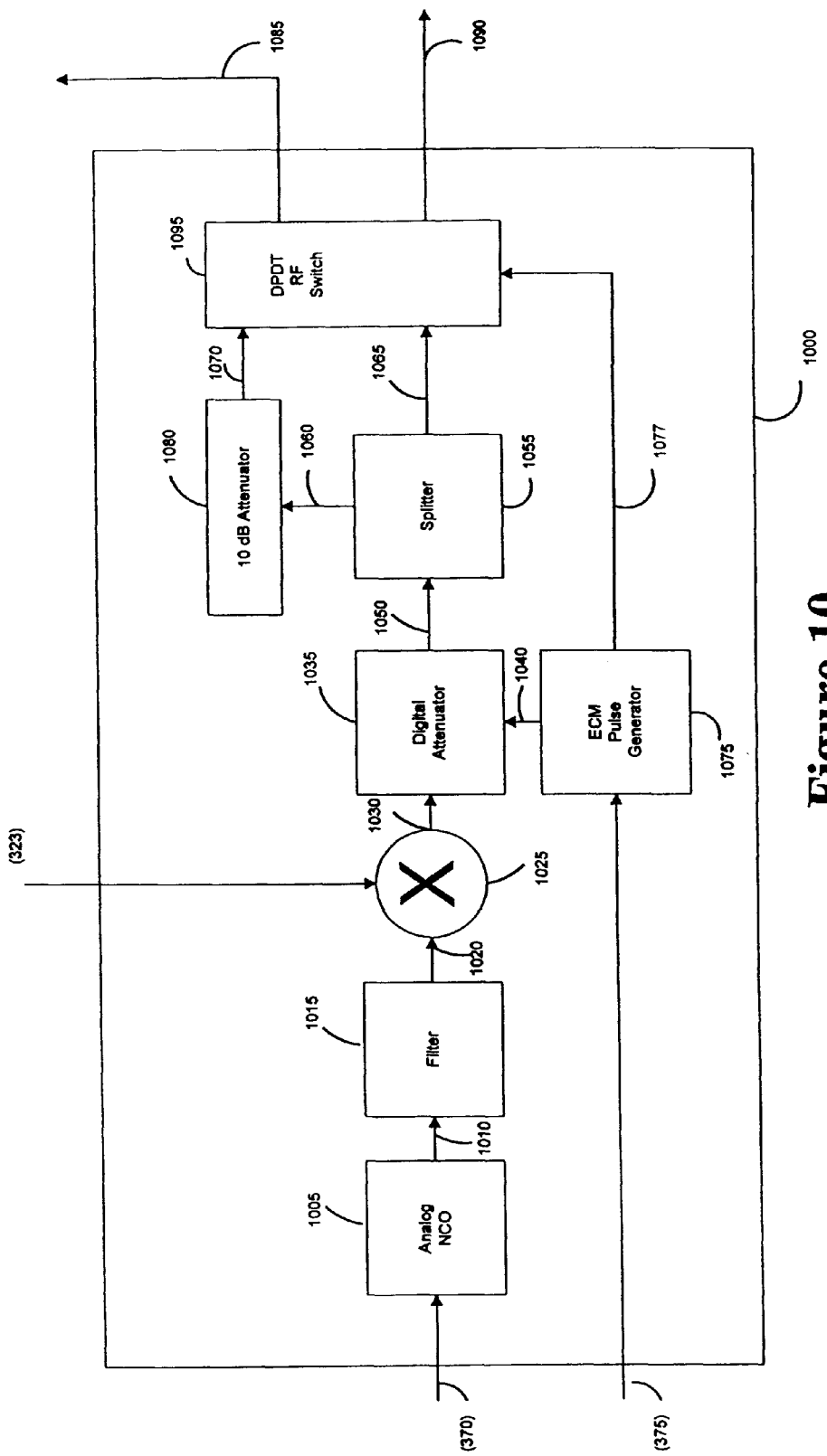
FIG. 10 is the deisgn of the ECM unit.

The ECM Section 1000, as shown in FIG. 10, provides jamming stimulation for the radarmain lobe 1085 and for radars that have one or more coherent side-lobe canceller channels (CSLC) 1090. The ECM Section consists of Analog Devices 9850 NCO that is used to generate a carrier for the jamming simulation, and hardware used to modulate the carrier in a pulse pattern that represents the effect of simulated jamming on the radar. The ECM Section 1000 also includes hardware used to generate a stimulation signal for the radar CSLC channel 1090. The jamming simulation is controlled by the software by setting the frequency of the jamming carrier signal 370 and by programming the ECM Section 1000 for a pulse pattern in real time 375.

There are seven steps in the signal synthesis process that is used on the chirp/Doppler IF generator. These processing stages are shown in sequence on FIG. 2 with the corresponding hardware shown as boxes on FIG. 3. The process starts with radar sync 365 and data from the DRLMS that represents the current simulated radar sweep.

The following sections describe the processing for each of the seven steps identified on FIG. 2.

Chirp/Doppler Range Counters

Each of the four range counters on this card performs the same function. A single radar sweep is divided into a sequence of range bins with the size of each range bin equal to the resolution of the radar. For example, the AN/SPS-49 (V)3 has a range resolution of 1.5 $\mu$sec or about 250 yards so each range bin is 1.5 $\mu$sec long when the GNSS is connected to a AN/SPS-49(V)3 radar. The range counter provides an address that sequences through all of the range bins at the rate defined by the size of the range bin and starting with the radar sync. In the AN/SPS-49(V)3 example, the range counter output would start at zero at the radar sync then increment one address every 1.5 $\mu$sec. This address is then used in the chirp/Doppler memory to look up data that represents the radar signal at the current range time.

This is a simple process for most radars as the range counter can be restarted with every radar sync; most radars are not designed to process ambiguous radar returns. Targets at a range farther than one pulse repetition interval (PRI) are known as ambiguous targets, and targets closer than one PRI are nonambiguous. The AN/SPS-49(V)3 has a short range mode with a PRI of 1 millisecond or 1,000 $\mu$sec. This means that the range counter for the AN/SPS-49(V)3 counts up to range bin number 1,000/1.5, or 667, at which time it receives another radar sync and starts over. Range bin 667 contains data representing the simulated radar signal at a range of 167,000 yards, or 84 nautical miles (nmi). This is the maximum nonambiguous range of the AN/SPS-49(V)3 radar in short range mode, using the 1,000 Hz pulse repetition frequency (PRF). Because the AN/SPS-49(V)3 does not process ambiguous range data, this is also the maximum instrumented range of the AN/SPS-49(V)3 in short range mode. Because most radars do not process ambiguous range data, the GNSS does not have to synthesize ambiguous range data for most radars, and the range counter can start over at zero on every radar sync. This means that only one range counter is required for most radars. One of the GNSS radars (AN/SPS-49A), however, does process ambiguous range data 1105, as illustrated on FIG. 11. The AN/SPS-49A has a randomly varying PRI (shown at 1100 with a minimum value of 850 $\mu$s and an average value of about 1 millisecond and is instrumented out to a range of 256 nmi. If only one range counter was used with the AN/SPS-49A, the GNSS would not generate radar data beyond a distance of about 84 nmi, leaving no stimulation signal for the last 172 nmi of radar range.

Figure 11:
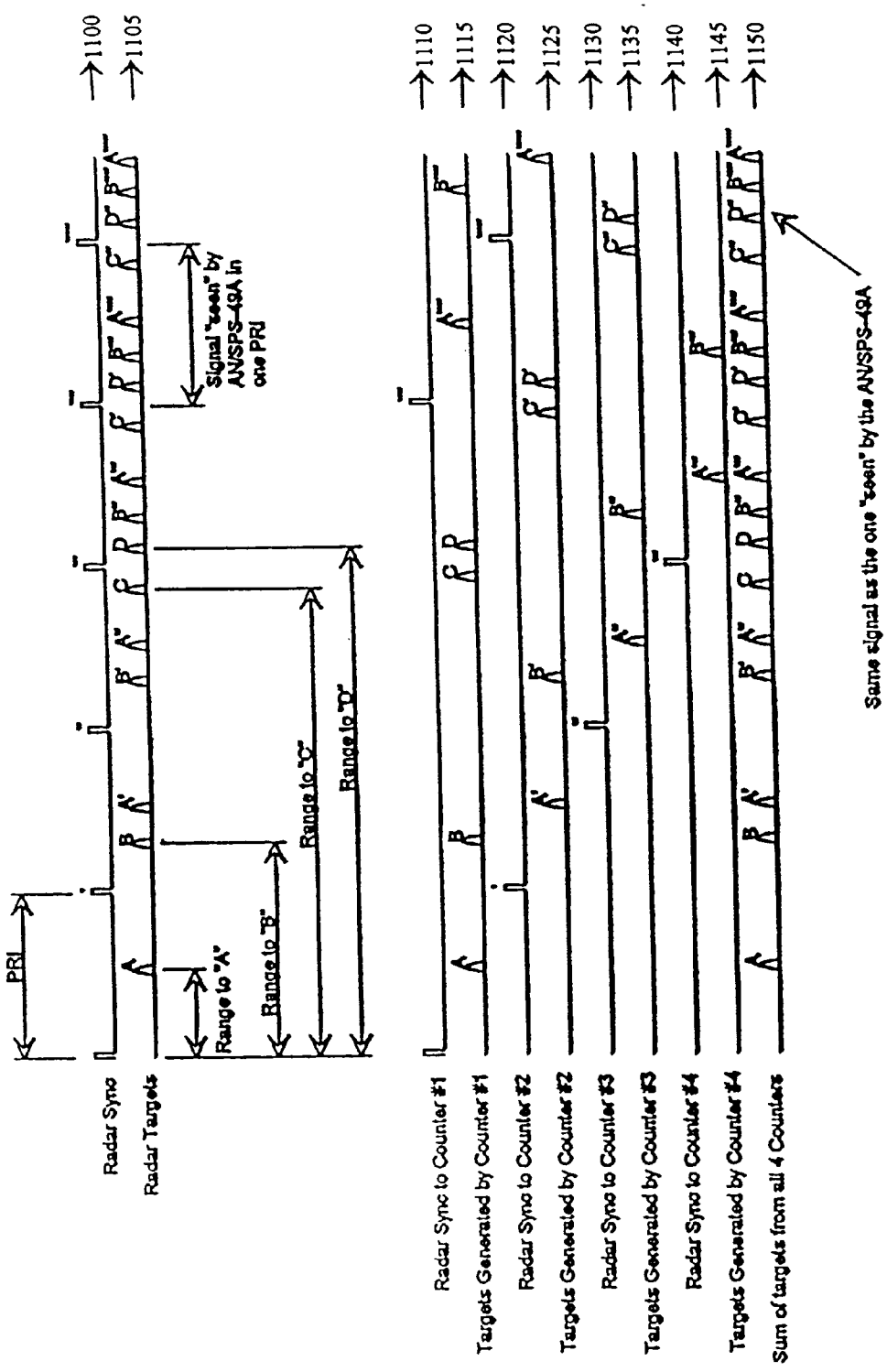
FIG. 11 represents the AN-SPS-49A range ambiguity problem and its solution using a plurality of range counters.

The solution, also shown on FIG. 11, is to provide multiple range counters, each of which is permitted to count to the maximum radar range before it is restarted by a radar sync 1110,1120,1130 and 1140. Because the radar has a maximum range of 256 nmi and one PRI is about 84 nmi, four range counters are required, each of which counts to at least 256 nmi before it is reset by a radar sync. This is accomplished on the chirp/Doppler IF generator by providing four independent range counters and cycling the radar sync from one to the next, so that each counter is reset every fourth radar sync. As shown on FIG. 11, the sum of the resultant targets 1150 from all four counters 1115, 1125, 1135 and 1145 is the desired stimulation signal. The outputs from the four range counters are then time-multiplexed by the range counter multiplexer 425 onto a single address bus for use in the chirp/Doppler memory as shown on FIG. 3.

The same design problem was encountered in the AN/SPG-60 and the AN/SPG-51 range-redundant fire control radars with Device 20B4. Both of these radars have very short PRIs and range ambiguity processing out to ranges in excess of 10 PRI intervals. The problem could be solved similarly in any other radars in which a range ambiguity problem was encountered.

Chirp/Doppler Memory

There are three components in the chirp/Doppler memory: a double buffered memory, a range attenuation memory, and a multiplier.

The double buffered memory serves as the interface between the GNSS software and the hardware on the chirp/Doppler IF generator. The memory is double buffered so that the hardware can use one half of the memory while the software is loading the other half with data for the next azimuth interval. This process is controlled by the software, which loads the memory with data, and then signals the hardware on the chirp/Doppler IF generator to switch from one buffer to the other as the radar sweeps past the current azimuth increment. The buffer that was being read by the hardware is then available for data loading from the software. The switch from one-half to the other is coordinated with the radar sync to prevent discontinuities in the data.

Each memory location contains data that represents the simulated radar signal for one range bin. Each range bin contains three pieces of data: one that represents the strength of the signal in the range bin, one that selects which of eight available simulated Doppler signals is to be used for that range bin, and one that indicates whether or not the data in the range bin represents a moving or stationary target.

Data is read from the memory by the range counters. Each range bin is time-divided into four intervals, and data is taken from the memory for each of the four range counts during these four intervals.

A second memory is also provided that contains data that represents the effect of distance on the simulated signal expressed as an attenuation. At the same time that data is read from the double buffered memory, the signal amplitude data from the double buffered memory is multiplied by a range attenuation value from the same location in the range attenuation memory. The range attenuation memory is loaded by the GNSS software when the system is powered up.

The last step is to multiply the signal amplitude by the range attenuation value and supply the result on to the waveform generator and to the Doppler synthesizer. This result consists of four signal strength values time-multiplexed onto one output.

Doppler Synthesis

Figure 12:
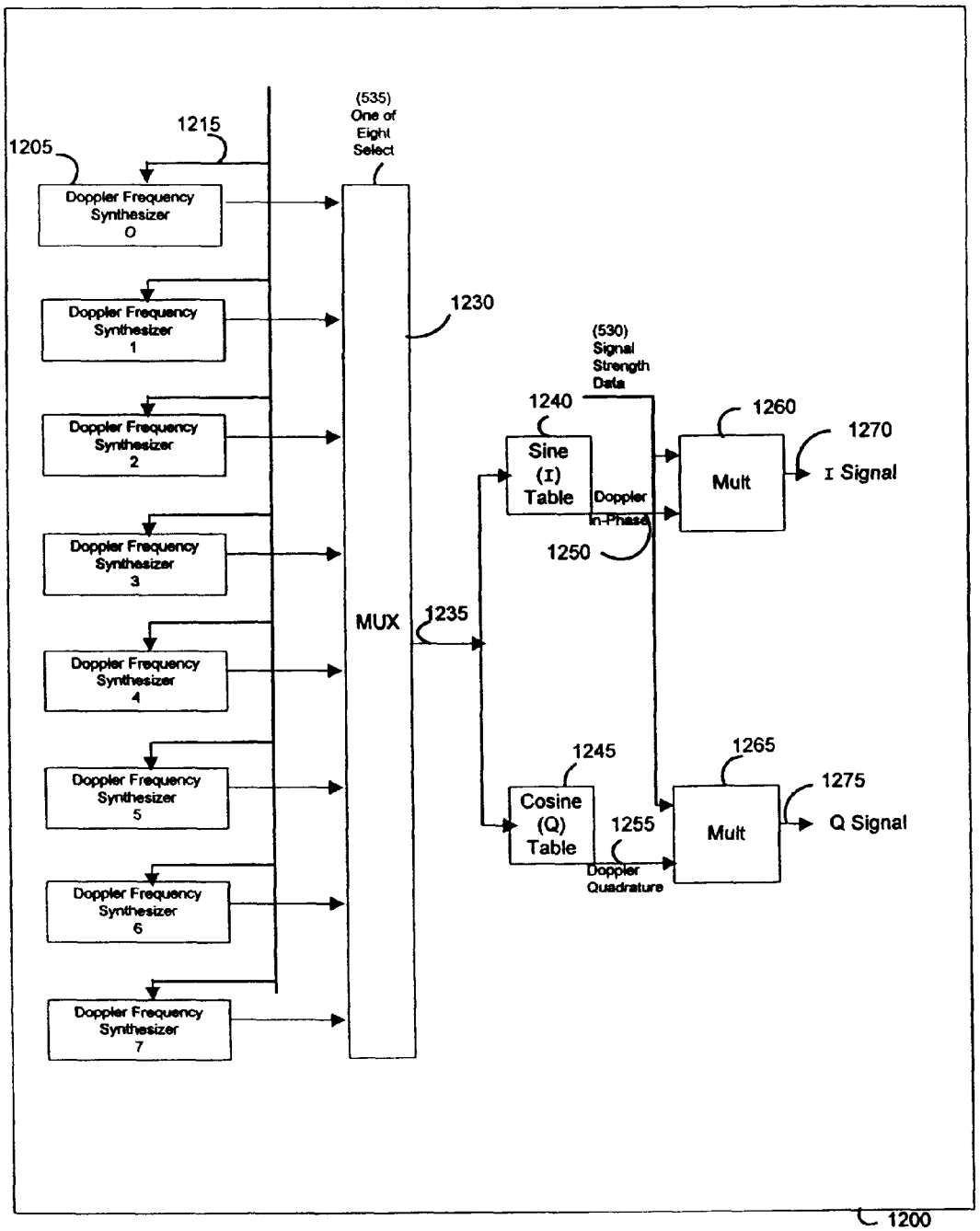
FIG. 12 depicts the design of the Doppler synthesizer.
Figure 13:
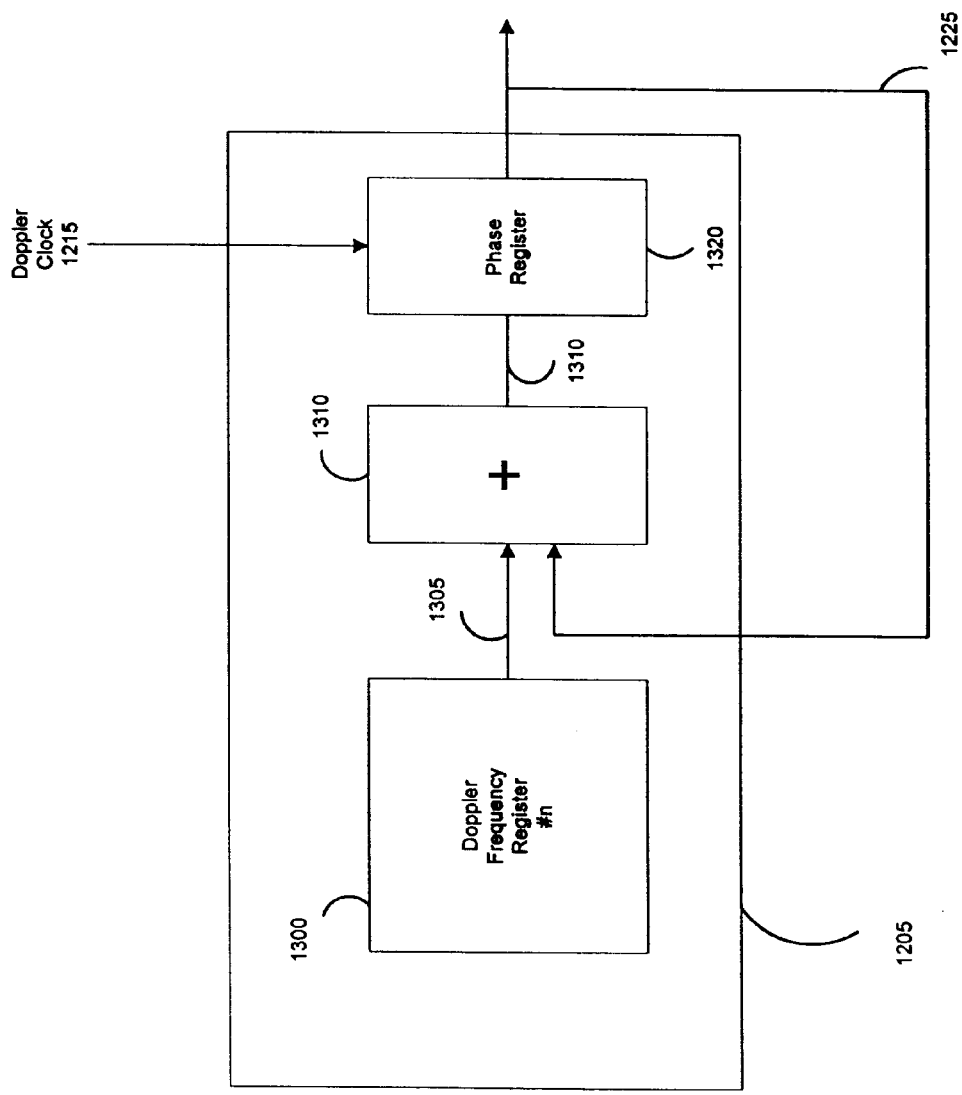
FIG. 13 is the design of the Doppler Frequency synthesizer unit of the Doppler synthesizer.

For radar data that does not require chirp modulation, the first stage of the signal synthesis process is to add the effect of Doppler shift to the data from the DRLMS. The Doppler signal generators, shown on FIG. 12, are digital devices that are programmed for eight different Doppler frequencies when the GNSS is initialized. A generic Doppler frequency synthesizer is shown in FIG. 13 for Doppler frequency synthesizer #n. Each of the eight Doppler frequency synthesizers 1205 consists of a Doppler frequency register 1300, an adder 1310 and a phase register 1325. The output 1305 of the Doppler frequency register 1300 is added in adder 1310 to the output 1225 of the previous clock cycle of the phase register. The output 1315 of the adder 1310 is accpeted by the phase register 1325. This technique is similar to the technique used in Device 20B4 to generate Doppler signals.

Eight Doppler frequency synthesizers 1205 are provided so that the GNSS stimulation signal can stimulate each of the eight Doppler comb filters used in the MK 23 TAS radar. Although none of the other GNSS radars has as many as eight comb filters in their Doppler processors, eight is the number of different Doppler frequencies that are needed for the GNSS to ensure that all of the Doppler filters are stimulated.

A precalculated Doppler frequency data word is stored in each of the Doppler frequency registers 1300 when the GNSS is initialized. This data represents the amount that each Doppler synthesizer must be incremented in order to achieve the desired output frequency. The output 1225 of the Doppler frequency synthesizer is accepted by the multiplexer 1230.

Figure 14:
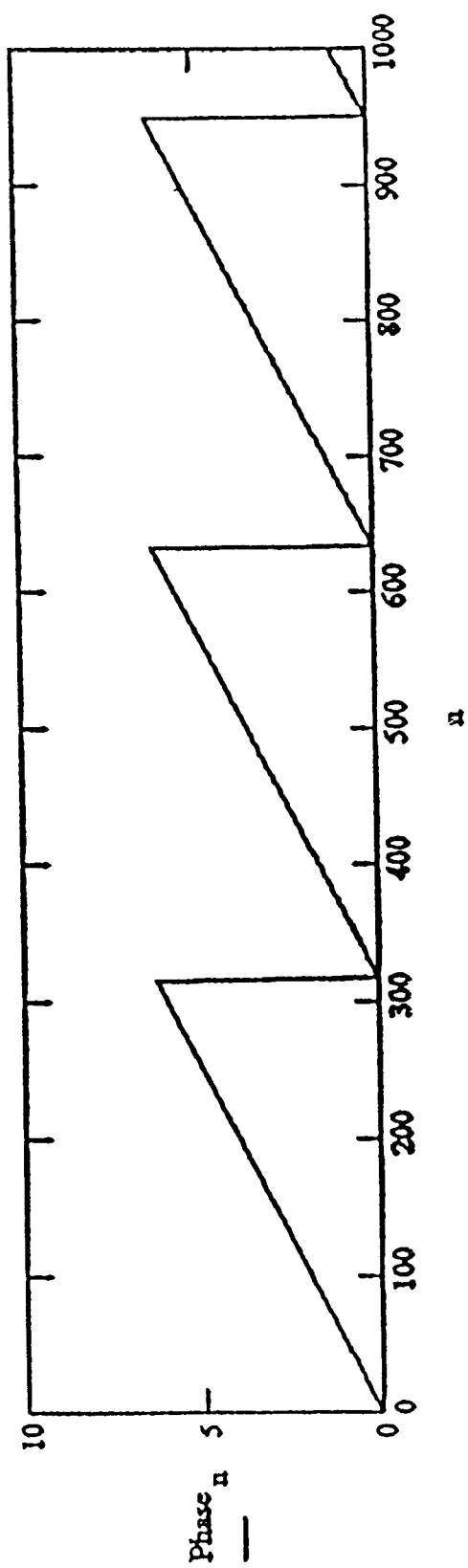
FIG. 14 is a representation of the output of the phase register of the Doppler synthesizer.

At each Doppler clock interval 1215, the Doppler frequency data is added to a stored phase value saved from the previous clock interval. This means that the Doppler phase value stored in the phase register 1320 increases at a rate set by the data in the Doppler frequency register 1300. The number in the phase register overflows periodically, representing the end of a single Doppler waveform cycle. The output 1225 from each of the phase registers 1320 is similar to the waveform shown on FIG. 14, with each synthesizer 1205 producing an independent waveform.

Figure 15:
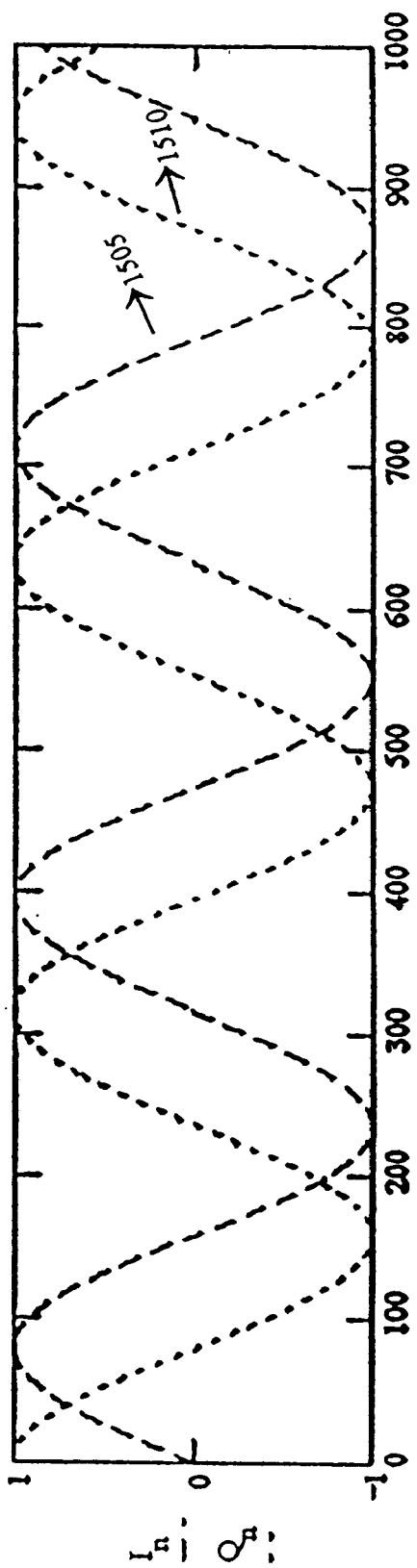
FIG. 15 illustrates a simulated Doppler signal.

One of the eight Doppler synthesizer outputs 1225 is selected by the multiplexer (mux) 1230 based on the Doppler data in the current range cell represented by the one of eight select line 535 and that output is sent to a pair of lookup tables 1240 and 1245. The lookup tables 1240 and 1245 are memories that have been loaded with data that represents a sine wave 1240 and a cosine wave 1245, respectively. The output 1250 and 1255 from the sine and cosine lookup tables are shown on FIG. 15. The output 1250 from the sine lookup table 1240 is the in phase component of Doppler, shown as I on the figure with a dashed line 1505, and the output 1255 from the cosine lookup table 1245 is the quadrature component, shown as Q on the figure with a dotted line 1510. Both the in phase and quadrature signals are needed as inputs to the SSB modulator. The operation of the SSB modulator and the requirement for both an I and a Q version of this signal are described in the chirp/Doppler single sideband modulation section.

Each of the eight Doppler frequency synthesizers 1205 operate continuously without regard to radar sync or any other interruption. In this manner, the phase of the simulated Doppler signal is preserved from one radar PRI to the next.

The frequency of the simulated Doppler signal is a function of both the frequency data loaded at initialization and the Doppler clock frequency as shown in Equation 1.

All of the Doppler signals that have to be generated for the GNSS are low frequency audio signals that range from about −1500 to +1500 Hz. The Nyquist criteria states that in order to generate these signals, the sample rate, which is equal to the Doppler clock frequency, must be at least twice as high as the maximum frequency component of the Doppler signals. This implies a minimum Doppler clock rate of about 3000 Hz for the GNSS.

$$Frequency_{DOPPLER} = \frac{F}{F_{MAX}} * \frac{Dop_{CLK}}{2}$$

Where:
F=Frequency Data
$F_{MAX}$=The maximum value possible for F
$Dop_{CLK}$=Frequency of the Doppler clock Equation 1 Doppler Frequency Generation Higher Doppler clock rates improve the fidelity of the Doppler simulation, but there is a point where it no longer makes sense to increase the clock rate. As the clock rate increases, the number of bits used in the synthesizers must be increased to maintain a constant frequency resolution. The tradeoff that this represents becomes a choice between increasing the clock frequency and keeping the number of data bits to a minimum. The GNSS is designed with a 100,000-Hz Doppler clock rate. This permits the generation of high fidelity Doppler signals up to about 33,000 Hz, well above the Doppler capabilities of any currently deployed Navy shipboard pulse Doppler radar system. With a Doppler clock of 100,000 Hz and a frequency data word of 16 bits, the frequency resolution of the Doppler synthesizers is less than 1 Hz.

Finally, the sine 1250 and cosine 1255 outputs from the Doppler synthesizer are multiplied 1260 and 1265 by the signal strength data 535 supplied by the DRLMS and stored in the double buffered memory. This gives the Doppler signal the appropriate amplitude for additional processing in the SSB modulator. The output of the multiplier 1260 that follows the sine (I) lookup table 1240 is the I or in phase signal 1270. The output of the multiplier 1265 that follows the cosine (Q) lookup table 1245 is the Q or quadrature signal 1275.

Chirp Waveform Synthesis

The waveform synthesis portion of the chirp/Doppler IF generator is the part that adds chirp pulse compression modulation to the simulated radar signal. There are two parallel paths in the waveform generator, one for the in phase signal and one for the quadrature signal. Both of these signals are needed in the SSB modulator of the chirp/Doppler IF generator, as explained in the chirp/Doppler single sideband modulation section.

Each of the two signal paths includes three steps: to add the effect of moving targets and accumulate the four pieces of data from the memory into one set of data, to generate the waveforms and to increase the waveform sample rate to be compatible with the SSB modulator.

Moving Target Indicator (MTI)/Accumulate/Impulse Generation

The first step in this process is to add the effect of moving targets to the signal amplitude. A moving target adds a Doppler shift to the radar waveform before it is reflected back to the radar, and a stationary one does not. Doppler shifts are evidenced in the radar return signal by a phase shift that varies from one PRI to the next; thus, a moving target generates a signal return with a varying phase shift, and a stationary target generates a signal with a constant phase shift.

Because the chirp/Doppler IF generator is phase-locked to the radar COHO signal, the radar stimulation signal generated by this card inherently has no phase shift from one PRI to the next and represents a stationary target. For simulated moving targets, it is necessary to add a phase shift on each PRI. The simplest way to shift the phase of the stimulation signal is to invert (i.e., negate) the input to the waveform generator periodically, which gives the output signal a 180 degree phase shift. In the GNSS, this is done by changing the sign bit of the amplitude data on every second PRI for moving targets and doing nothing for stationary targets. Inverting the sign of the data effectively represents a Doppler shift equal to one-fourth the PRF, or one-half of the maximum Nyquist Doppler frequency. This puts the simulated moving target Doppler shift in the center of the Doppler filters used in the radars that are stimulated by the GNSS and guarantees that the radar interprets these signal as moving targets.

The second step in this function is to accumulate the four pieces of data that come from the memory into one piece of data per range bin. This is done in a four-step accumulator 715 that simply adds the four time-multiplexed signal amplitudes 550 in one range bin before the data 720 is sent to the waveform generator 725.

The output 720 of the accumulator 715 is sent to the impulse generator 725 where the signal is gated with a narrow, one-sample period pulse to form an impulse representation of the signal for use in waveform synthesis.

Waveform Synthesis

Figure 16:
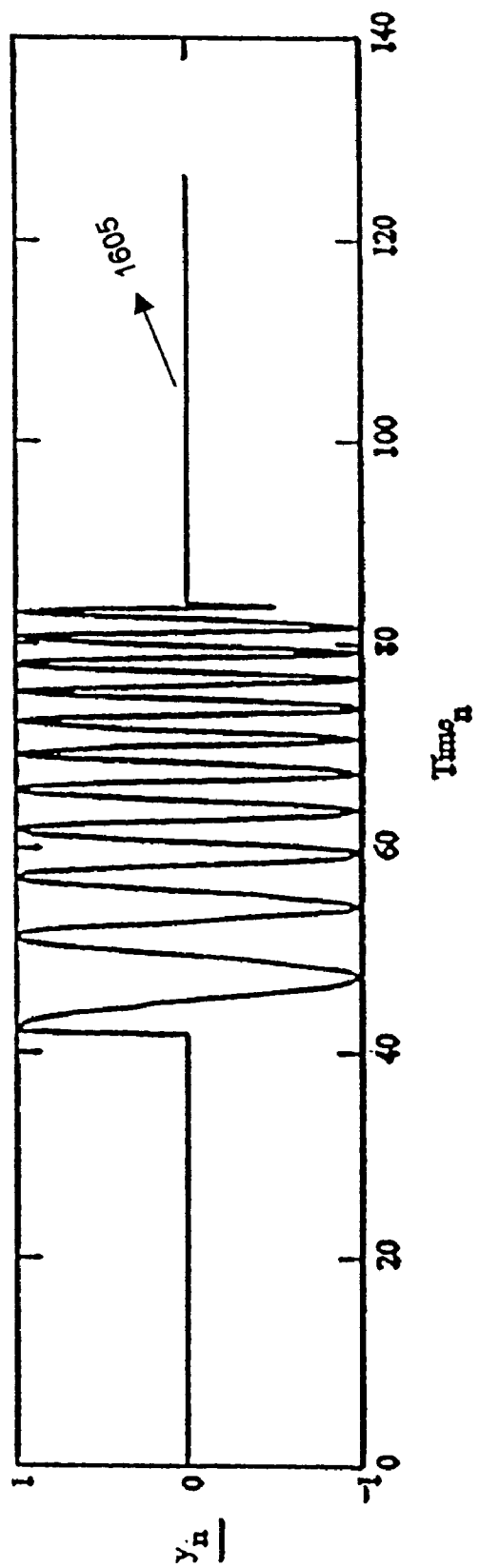
FIG. 16 is an example chirp waveform.

A pulse chirp waveform is a pulsed RF signal in which the RF frequency is linearly swept during the pulse time. The waveform shown on FIG. 16 is an example of this type of signal. In the example, the frequency of the waveform 1605 starts at a relatively low frequency, then increases gradually over the length of the pulse. Alternatively, it could also start at a relatively high frequency and decrease gradually over the length of the pulse. The direction of chirp is a parameter that is determined by the design of the radar, and there is no difference in the technique for synthesizing or processing either type of chirp signal.

The signal 1605 on FIG. 16 is composed of two elements: a fixed frequency carrier and a chirp modulating signal. The carrier frequency is equal to the frequency at the center of the pulse, and the effect of the chirp modulation is to sweep the frequency from below the carrier signal to above the carrier signal. This means that this signal has frequency components as high as the carrier frequency plus the frequency sweep value.

The Nyquist criteria states that a digital system must have a sample data rate at least twice the highest frequency component in the synthesized signal. To synthesize a signal 1605 like the one on FIG. 16, therefore, requires a sample data rate at least twice as high as the highest frequency in the waveform. In this type of waveform, this is a frequency that is twice the carrier frequency plus twice the frequency deviation. The complexity and the size of the hardware needed to process this type of data increases as the sample data rate increases; that is, the highest frequency components in the synthesized signal have to be minimized.

There are two frequency parameters in the signal 1605 on FIG. 16 that can be manipulated: the carrier frequency and the frequency deviation. The frequency deviation must equal the actual radar frequency deviation in order for the waveform generator to work; therefore, the only parameter that can be varied successfully is the carrier frequency.

Figure 17:
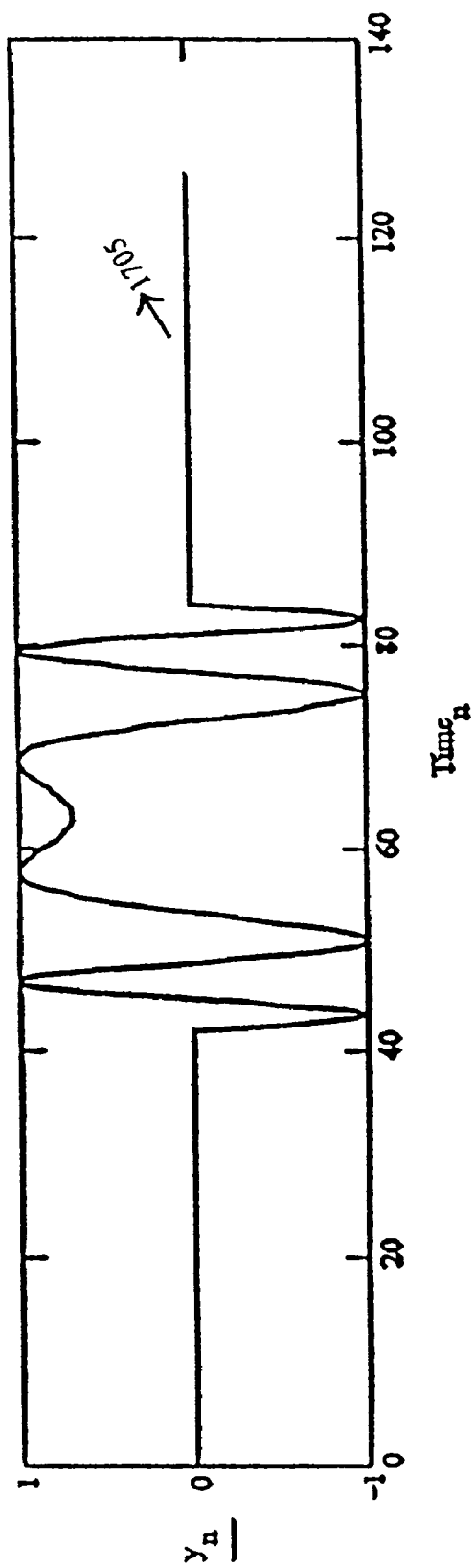
FIG. 17 is an example chirp waveform with no carrier.

Setting the carrier frequency of the waveform 1605 on FIG. 16 to zero produces the waveform 1705 on FIG. 17. The signal sweeps from a negative frequency value equal to the inverse of the frequency deviation to a positive frequency equal to the frequency deviation. The maximum frequency of this signal can be thought of as the frequency deviation value.

Due to the nonlinear nature of this waveform, the maximum frequency components of this signal are considerably higher than the frequency deviation. Experience with the MK 23 TAS radar indicates that using a value of twice the frequency deviation for the maximum frequency component results in a waveform synthesis process that suffices for radar stimulation.

The radars stimulated by GNSS have a range of frequency deviation values as listed in Table I. The AN/SPS-48E is not stimulated by the chirp/Doppler IF generator because of the special processing required to simulate the height-finding features of that radar. The design of 3D IF generator two-card set for the AN/SPS-48E includes a waveform synthesizer similar to the one on the chirp/Doppler IF generator to support the AN/SPS-48E; thus, the parameters for the AN/SPS-48E are included here for completeness. The waveform 1705 in FIG. 17 has the chirp parameters associated with the MK 23 TAS radar. The waveform generator is designed around producing waveforms like the one in FIG. 17.

TABLE I

GNSS Radar Pulse Compression Parameters

| Radar | Pulse Width ($\mu$sec) | Compressed Pulse Width ($\mu$sec) | Sweep (KHz) |
|---|---|---|---|
| AN/SPS-49 | 125 | 2 | −500 to +500 |
| AN/SPS-49 | 65 | 2 | −500 to +500 |
| AN/SPS-49A | 32 | 1.5 | −450 to +450 |
| AN/SPS-40 | 60 | 6 | −750 to +750 |
| MK23 TAS | 42 | 3.8 | −180 to +180 |
| AN/SPS-48E | 27 | 3 | +300 to −300 |

Figure 18:
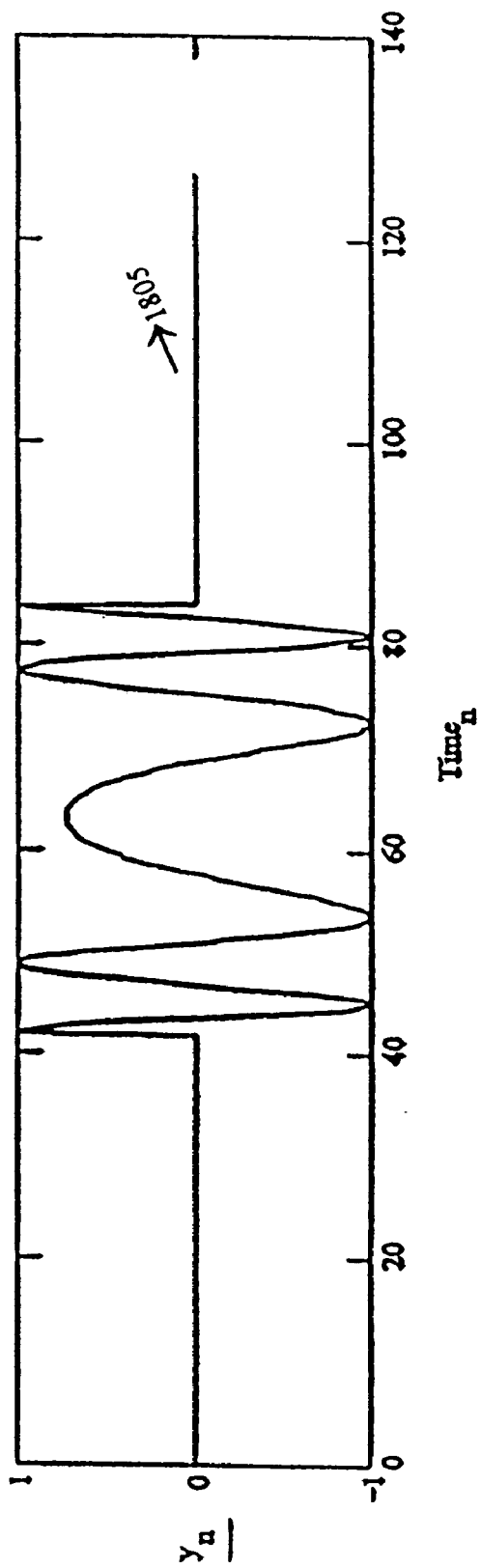
FIG. 18 is an example of a quadrature waveform.

Because the single sideband modulator requires both an in phase and a quadrature component, two waveforms 1705 and 1805 are actually generated, an in phase one similar to one on FIG. 17, and a quadrature one similar to the one in FIG. 18. The two waveforms are produced in parallel in identical hardware.

Figure 19:
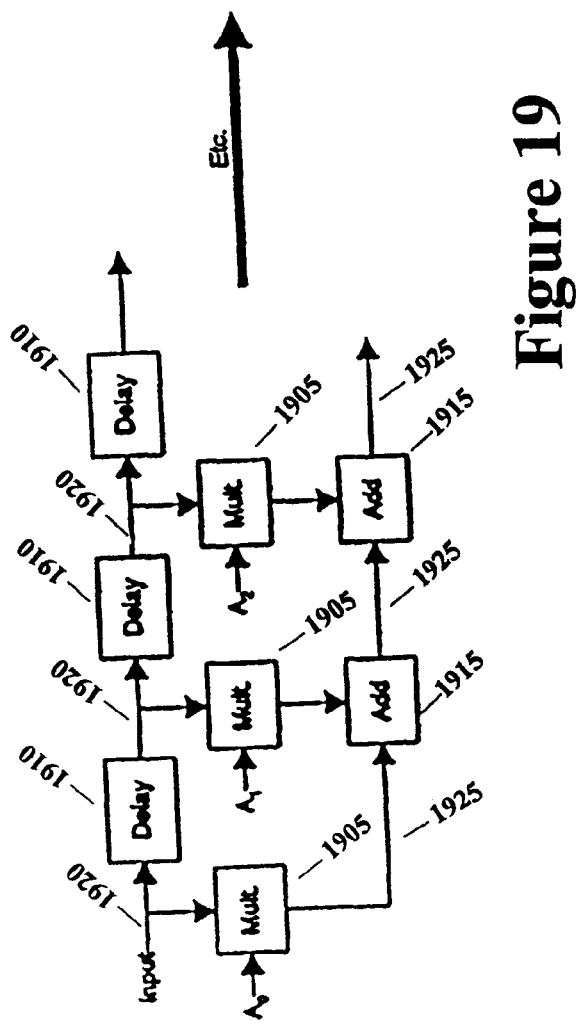
FIG. 19 depicts the design of a finite impulse response filter.

Generation of these waveforms takes advantage of the characteristics of a digital finite impulse response (FIR) filter. The general form of a FIR filter is shown on FIG. 19.

There are three elements to a FIR filter that are repeated for as many times as required for the specific application. These three elements are a multiplier 1905, a one-sample time delay 1910, and an adder 1915. The combination of one multiplier 1905, one delay 1910, and one adder 1915 is called a tap or a stage. Each stage of the filter accepts an input 1920 from the previous stage, delays it by one sample time interval, multiplies it by a unique fixed number ($A_0$ through $A_{n-1}$ on FIG. 19 for n stages), and adds the result to the output from the previous stage. The delayed input to each stage is also provided as an output to the next stage. This type of filter has a finite impulse response as the output waveform 1930 is only as long as the number of taps given a one sample time input.

Two FIR filters are provided on the chirp/Doppler IF generator, one for the in phase signal and one for the quadrature signal. To program a FIR filter to produce a chirp waveform, the desired waveforms are sampled and the samples are used as the fixed coefficients for the multipliers in the filter. After this is done, the filter produces the desired waveform each time that a single sample time signal, or impulse, is presented at the input.

For example, the filter input has been zero for long enough to fill all of the stages with zeros and an impulse of value 1 is presented at the input to the filter. The input is multiplied by the coefficient $A_0$, and added to the outputs from all of the other stages. Because all of the other stages have zeros in them, the output of the filter is $A_0$. One sample time later, the impulse at the input has propagated to the second stage, and the input has gone back to zero. The impulse (value 1) in the second stage is multiplied by the coefficient $A_1$, and added to the outputs from all of the other stages. Because all of the other stages still have zero's in them, the output of the filter is $A_1$. This process continues until the impulse has traveled all the way through the filter, and coefficient $A_{n-1}$ has been output.

Because the filter is programmed in the GNSS waveform synthesizer with coefficients that represent samples of the desired waveform, the resulting output sequence from $A_0$ to $A_{n-1}$ is a digital representation of the desired waveform.

Because the filter adds the outputs from all of the stages together to provide an output, this filter also produces a waveform for every impulse at the input, adding the waveforms together when they overlap. This process automatically solves the overlapping signal synthesis problem.

In the case of the GNSS simulation, sampling of the actual waveform is not required. Instead of sampling an actual waveform, an off-line simulation of the radar waveform generator is run that provides these coefficients. Because the simulation is digital and the output is already a series of samples, the sampling occurs for free.

The hardware used on the chirp/Doppler IF generator to implement the FIR filter is a commercial integrated circuit from Graychip designated as the GC2011 Transversal Filter. The GC2011 is a versatile, programmable part that is ideal for this application. There are two 16-stage FIR filters included in each GC2011 that can be cascaded to form one 32-stage filter. Furthermore, there are four coefficient registers in each stage that can be used to store four different coefficients for each stage. The GC2011 has a mode where the sample rate is one-fourth the clock rate and each stage is used four times, once with each of the four stored coefficients. This feature effectively provides one 128-stage filter or two 64-stage filters that operate at one-fourth the GC2011 clock rate. The GC2011 is rated for clock frequencies up to 80 MHz; thus, sample rates up to 20 MHz are supported in this mode.

Many FIR filter designs are symmetrical. In a symmetrical filter, the last half of the coefficients are the same as the first half, only the order is reversed. There are two types of symmetry possible, one where the middle value is not repeated (i.e., odd symmetry) and one where the middle value is repeated (i.e., even symmetry). The GC2011 is designed to take advantage of this fact by providing a mode in which the data is passed through the filter once forward and again backward. Using this mode and the ¼-rate mode, the GC2011 provides 255 taps for a filter with odd symmetry and 256 taps for filters with even symmetry.

All of the waveforms that must be simulated for the GNSS have odd symmetry. This can be clearly seen by examining FIG. 17 and FIG. 18. Each GC2011 has up to 255 taps available for GNSS. The design of the chirp/Doppler IF generator includes two GC2011 parts, one for the in phase signal and one for the quadrature signal.

The number of taps actually required for each of the radars is listed in Table II. The number of taps required is a function of both the size of the frequency deviation and of the radar pulse width. The required sample rate is based on the frequency deviation, the Nyquist criteria, and experience with the MK 23 TAS. To obtain the sample rates listed in Table II, the frequency deviations have been multiplied by a factor that takes the Nyquist criteria into account, as well as the previously stated fact that there are frequency components above the value of the frequency deviation. Experience with prototype testing on the MK 23 TAS indicates that a factor of three is sufficient. In the design of the GNSS, a factor of four is used to provide an extra measure of fidelity that assures satisfactory operation.

TABLE II

Waveform Generator Sample Rates

|  | AN/ SPS-40 | AN/ SPS-49 | AN/ SPS-49A | MK 23 TAS | AN/ SPS-48E |
|---|---|---|---|---|---|
| Half sweep (Hz) | 750,000 | 500,000 | 450,000 | 180,000 | 300,000 |
| Factor (Nyquist = 2) | 4 | 4 | 4 | 4 | 4 |
| Min sample Rate (Mhz) | 3.000 | 2.000 | 8.000 | 0.720 | 1.200 |
| GC2011 Mode | ¼ | ¼ | ¼ | ¼ | ¼ |
| GC2011 clock (MHz) | 12.00 | 8.00 | 32.00 | 2.88 | 4.80 |
| Radar Pulse Width | 60 μsec | 125/65 μsec | 32 μsec | 42 μsec | 27 μsec |
| Samples (FIR Taps) | 181 | 251/126 | 256 | 31 | 33 |

To calculate the number of taps required, it is necessary to multiply the pulse width by the sample rate. As shown in Table II, all of the waveforms required for the GNSS require 256 or fewer taps. By taking the symmetrical nature of the waveforms into account, only one GC2011 chip running in the 4× mode is needed for each channel in the waveform generator. The GNSS software selects and programs a clock frequency for the GC2011 chips when the system is initialized.

Resample Filters

The resample filters 745 are digital lowpass filters implemented in a FIR filter identical to the type used in the waveform generator. These filters are being used to increase the sample rate of the data coming from the selector 805 to equal the clock rate used in the SSB modulator. This step is needed to synchronize the data from the selector 805 to the clock signals used in the digital quadrature amplitude modulator (QAM) 820 and the numerically controlled oscillator (NCO) 825 and to allow the use of a QAM 820 and NCO 825 clock that is sufficiently high to be useful. The QAM and the NCO both operate at clock rates up to 60 MHz; the closer the sample rate is to 60 MHz, the higher the simulation fidelity is.

Figure 20:
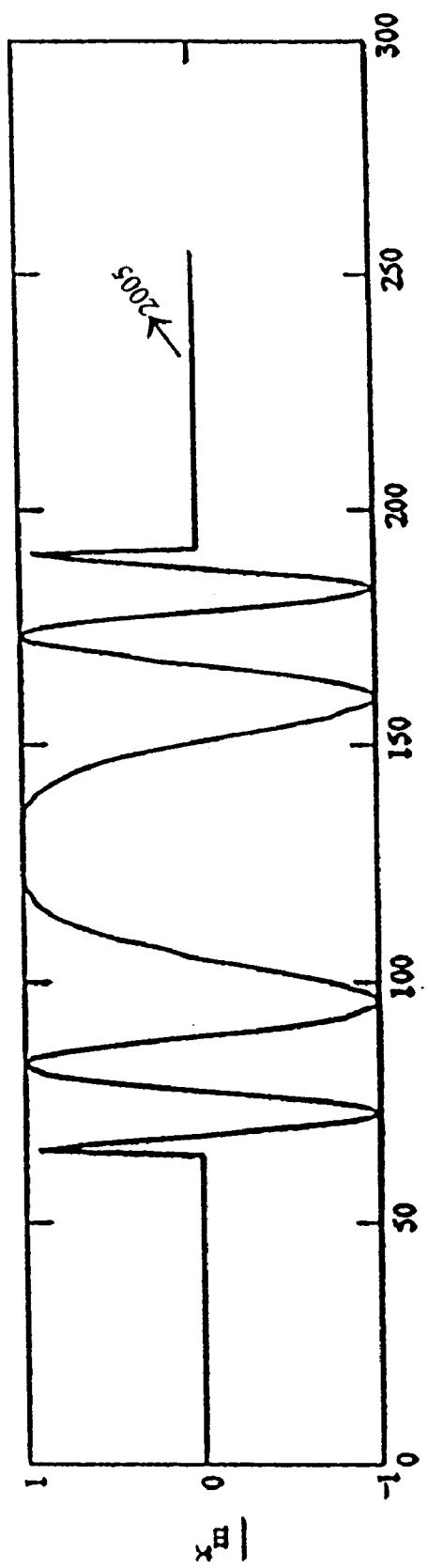
FIG. 20 is an example of a baseband chirp waveform.

The interpolation algorithm used on the chirp/Doppler IF generator is shown graphically in the following three figures. The waveforms in each of these figures were developed in a simulation of the FIR lowpass filters actually used on the chirp/Doppler IF generator. FIG. 20 shows a typical chirp waveform 2005 as it comes from the waveform generator. In this example, the x axis of the graph represents samples. Based on this, the example chirp waveform has a width of 128 samples, and starts 64 samples after the beginning of the chart.

The first step in the interpolation task is to add sample positions to the input waveform and give each of the new samples a value of zero. This is known as the zero-fill process. The output 2105 of this process, shown on FIG. 21, has the same timing as the input signal, but with more samples per second. In this example, there are four times as many samples on FIG. 21 as there were on FIG. 20, although the two signals have the same time duration. The zero-fill process occurs in the chirp/Doppler IF generator at the input to the FIR filters.

Figure 21:
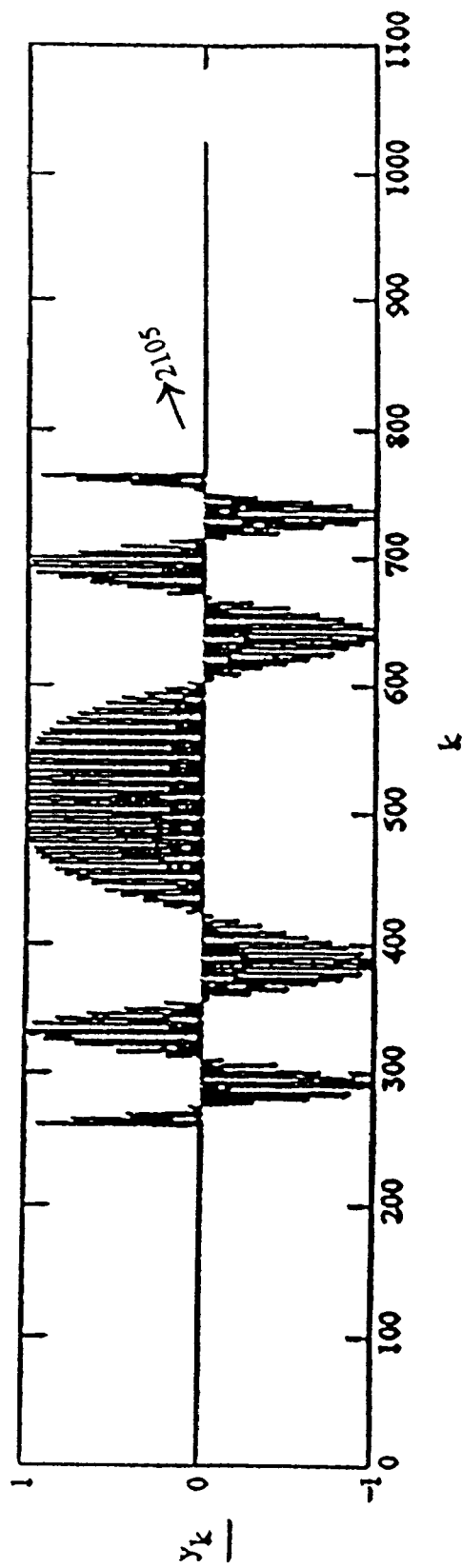
FIG. 21 is a baseband chirp waveform with increased sample rate with zero-fill.
Figure 22:
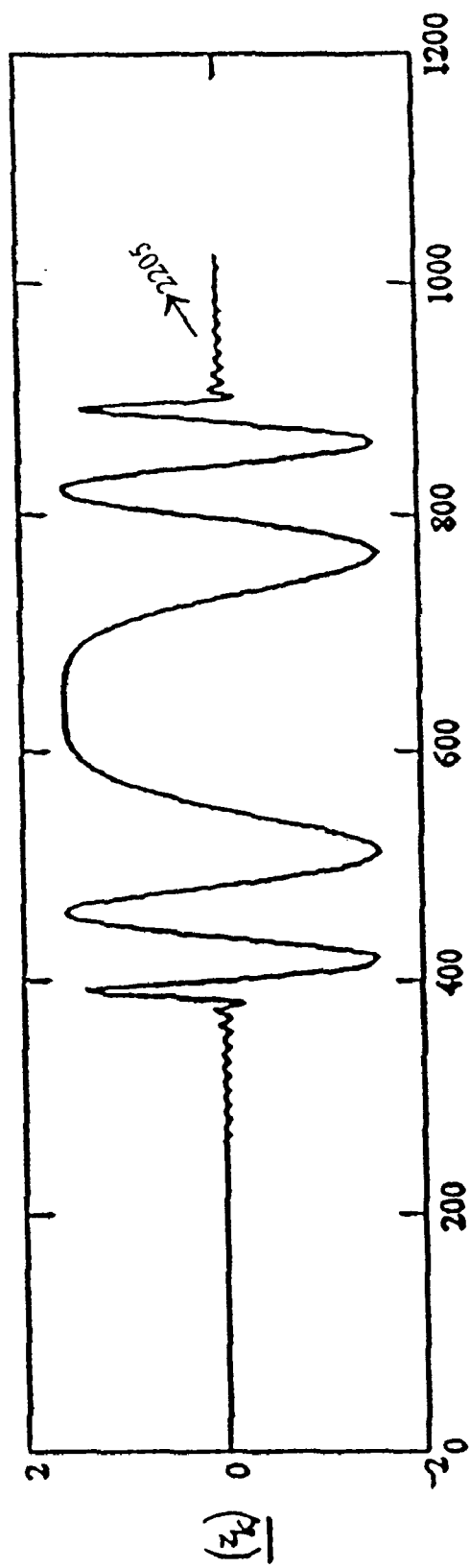
FIG. 22 is the interpolation output.

The final step is to pass the signal 2105 shown on FIG. 21 through a digital lowpass filter, implemented on the chirp/Doppler IF generator with a FIR filter. The output 2205 from a simulation of this filter is shown on FIG. 22. As can be seen by examining the input (FIG. 20) and the output (FIG. 22) the result closely resembles the input except that there are four times as many samples in the output waveform. The programmable nature of the digital FIR filter permits fine-tuning of the lowpass filter parameters to optimize it for this function even after the chirp/Doppler IF generator has been designed, built, and tested.

In principal, the sample rate of the input signal can be multiplied by any integer with this technique. The practical limitations are related to the design of the lowpass filter, the number of FIR taps that are available and the maximum sample rate that is supported by the hardware.

In the chirp/Doppler IF generator, for example, most of the radars use a 2-MHz sample rate in the waveform generator. Increasing this by a factor of 16 provides an output sample rate of 32 MHz, which permits a single sideband carrier frequency from the QAM of up to 10 MHz. Similarly, a factor of 8 provides a QAM sample frequency of 16 MHz, and a maximum usable carrier frequency of 5 MHz. The goal in the design of the lowpass FIR interpolation filter is to place the sample rate of the input to the QAM as close as possible to the QAM maximum clock rate of 60 MHz.

Chirp/Doppler Single Sideband Modulation

The SSB modulator consists of the QAM 820, a NCO 825, a digital/analog (D/A) converter 845, and the lowpass filter shown on FIG. 4 just after the selector 805.

The selector 805 is used to connect the SSB modulator to either the Doppler-synthesizer or to the waveform generator based on radar mode. Generally, when a radar is in short range mode, the selector 805 provides data from the Doppler synthesizer to the modulator; when the radar is in long range pulse compression mode, the output from the waveform generator is selected. The selector 805 is controlled by a data line 340 from the radar interface that indicates whether the radar is in short or long range mode.

The single sideband modulation technique used on the chirp/Doppler IF generator is a digital implementation of a phase shift SSB modulator. This technique is well known and has been in use for some time in analog SSB modulators, but the design of a reliable analog phase shift SSB modulator is nontrivial. With digital techniques, however, the design is straightforward.

A simple mathematical representation of a carrier signal and a simulated Doppler modulating signal is provided in Equation 2. The modulator works the same way for more complex modulating signals, such as the chirp waveform on FIG. 22.

Figure 23:
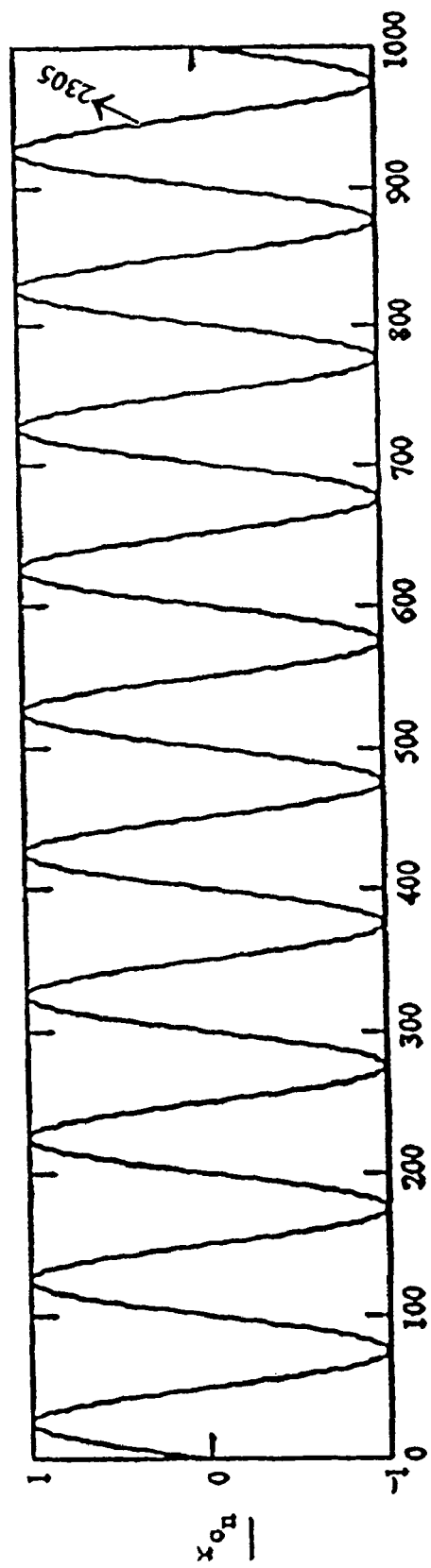
FIG. 23 is an example of a carrier signal.
Figure 24:
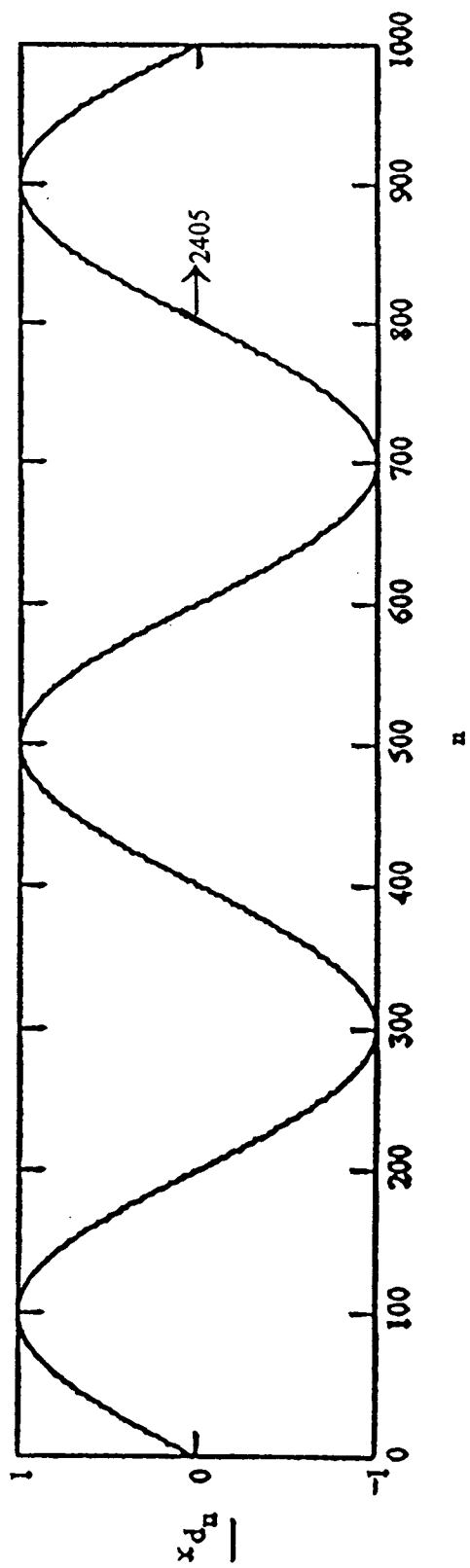
FIG. 24 is an example of a Doppler signal.

$x_C(t) = A_C \sin(2\pi f_C t)$ Carrier signal $x_D(t) = A_D \sin(2\pi f_D t)$ Doppler signal Equation 2 Carrier and Doppler An example of a carrier signal 2305 is provided on FIG. 23, and of a Doppler signal 2405 on FIG. 24. The frequencies chosen for the examples are 10 Hz for the carrier signal and 2.5 Hz for the Doppler signal. The time scale is in milliseconds.

Multiplying the carrier signal by the modulating Doppler signal gives the result shown in Equation 3. Equation 3 shows that there are two components in the output, one with a frequency equal to the sum of the carrier frequency and the Doppler frequency ($f_C + f_D$) and one with a frequency equal to the difference between the carrier frequency and the Doppler frequency ($f_C - f_D$). This is not what happens when Doppler is added to a real signal. In the real world, a signal with Doppler modulation would have only the $f_C + f_D$ component.

Figure 25:
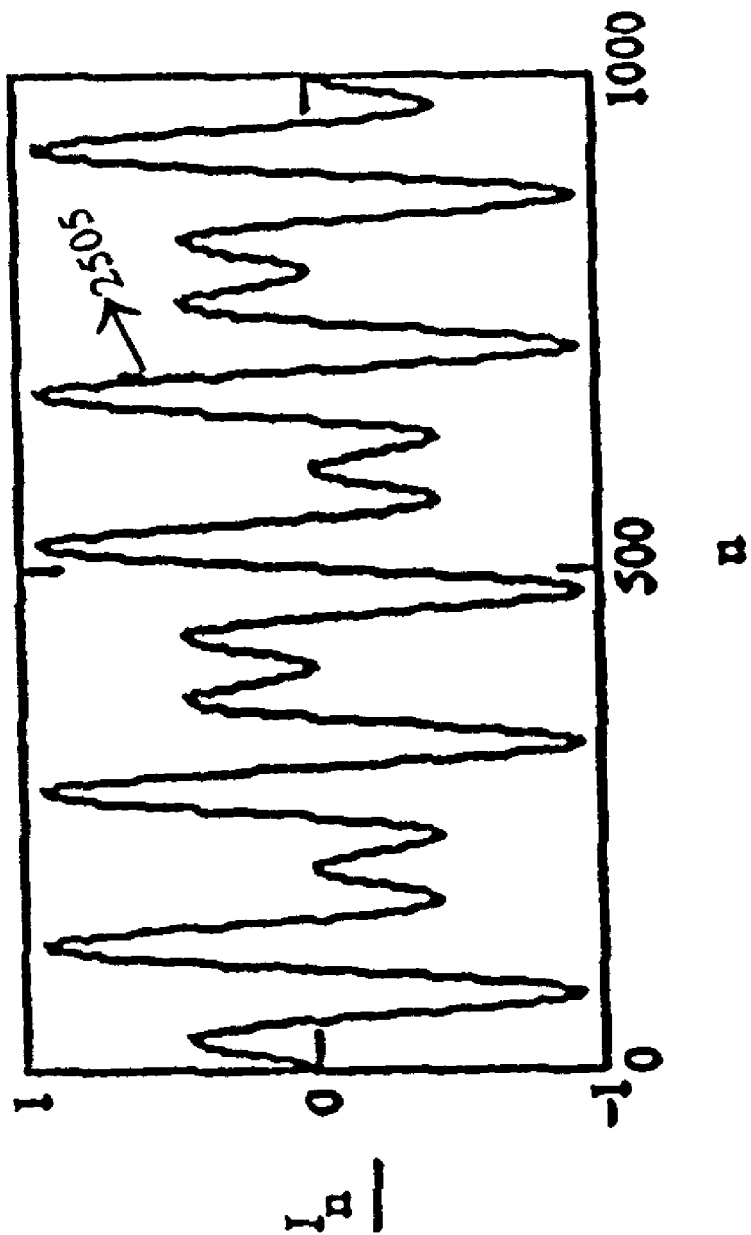
FIG. 25 represents the waveform that is the product of the carrier signal multiplied by the Doppler signal.

$x_C(t) * x_D(t) = A_C \sin(2\pi f_C t) * A_D \sin(2\pi f_D t) = \frac{1}{2} A_C A_D [\cos(2\pi (f_C - f_D)t) - \cos(2\pi (f_C + f_D)t)]$ Equation 3 Carrier Multiplied by Doppler The signal represented in Equation 3 is also shown on FIG. 25 using the example waveforms in FIG. 23 and FIG. 24. This signal 2505 does not look like a Doppler-shifted version of the signal in FIG. 23.

The signal represented in Equation 3 is a double sideband signal as it includes components for carrier frequency plus Doppler and carrier minus Doppler. Doppler simulation requires only the sum portion ($f_C + f_D$) without the difference portion.

The desired signal can be obtained if both the in phase (I) and quadrature (Q) versions of both the carrier and the modulating signal are available. Signals are in quadrature when one signal is out of phase with the other signal by 90 degrees, or $\pi/2$ radians. Equation 4 shows the mathematical expressions for the in phase and quadrature signals for both the carrier and the modulating Doppler signal. A cosine signal is in quadrature with a sine signal. This is why the Doppler signal generator is able to produce both an in phase and a quadrature signal at the same time by using two lookup tables.

$x_C(t) = A_C \sin(2\pi f_C t)$   Carrier signal In Phase (I)

$y_C(t) = A_C \sin\left(2\pi f_C t + \frac{\pi}{2}\right)$   Carrier signal Quadrature (Q)

$\quad = A_C \cos(2\pi f_C t)$ $x_D(t) = A_D \sin(2\pi f_D t)$.   Doppler signal In Phase (I)

$y_D(t) = A_D \sin\left(2\pi f_D t + \frac{\pi}{2}\right)$   Doppler signal Quadrature (Q)

$\quad = A_D \cos(2\pi f_D t)$

Equation 4 Carrier and Doppler with Quadrature Components

To remove the undesired lower sideband present in the double sideband signal represented by Equation 3, it is necessary to multiply the two quadrature signals together, as shown in Equation 5.

Figure 26:
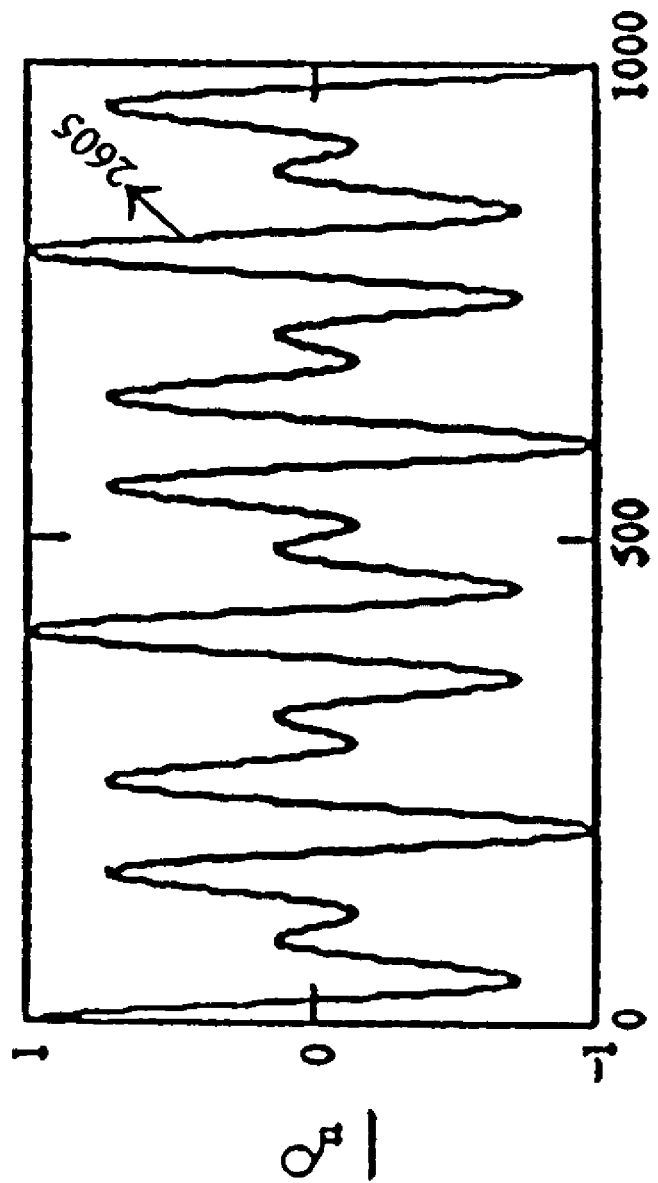
FIG. 26 represents the Doppler signals multiplied together.

$y_C(t)*y_D(t) = A_C \cos(2\pi f_C t)*A_D \cos(2\pi f_D t) = \frac{1}{2}A_C A_D[\cos(2\pi(f_C-f_D)t) + \cos(2\pi(f_C+f_D)t)]$ Equation 5 Quadrature Carrier Multiplied by Quadrature Doppler FIG. 26 shows this waveform 2605 for the example set of signals. Similar to the example waveform 2505 on FIG. 25, this waveform does not look like a Doppler shifted version of the signal 2305 in FIG. 23.

If the Q product shown in Equation 5 is subtracted from the I product shown in Equation 3, the result is a signal represented by the formula in Equation 6. When the terms in Equation 6 are combined, the result is Equation 7. The expression in Equation 7 has only one frequency component at a frequency of $f_D+f_C$ and an amplitude that is a product of the carrier and Doppler amplitudes. This is the desired simulation result.

$x_C(t)*x_D(t)-y_C(t)*y_D(t) = \frac{1}{2}A_C A_D[\cos(2\pi(f_C-f_D)t)-\cos(2\pi(f_C+f_D)t)-\cos(2\pi(f_C-f_D)t)-\cos 2\pi(f_C+f_D)t)]$ Equation 6 Single Sideband Modulation $x_C(t)*x_D(t)-y_C(t)*y_D(t) = \frac{1}{2}A_C A_D[-2\cos(2\pi(f_C+f_D)t)] = -A_C A_D \cos 2\pi(f_C+f_D)t$ Equation 7 Single Sideband Modulation Using $x_B(t)=A_B \sin[2\pi f_B(t^2/PW-t)]$ and $y_B(t)=A_B \cos[2\pi f_B(t^2/PW-t)]$, the single sideband modulation of time-overlapping chirp waveforms can likewise be shown to be $x_C(t)*x_B(t)-y_C(t)*y_B(t)=\frac{1}{2}A_C A_B[-2\cos(2\pi t(f_C+f_B(t/PW-1)))]=-A_C A_B \cos 2\pi t(f_C+f_B(t/PW-1))$.

Figure 27:
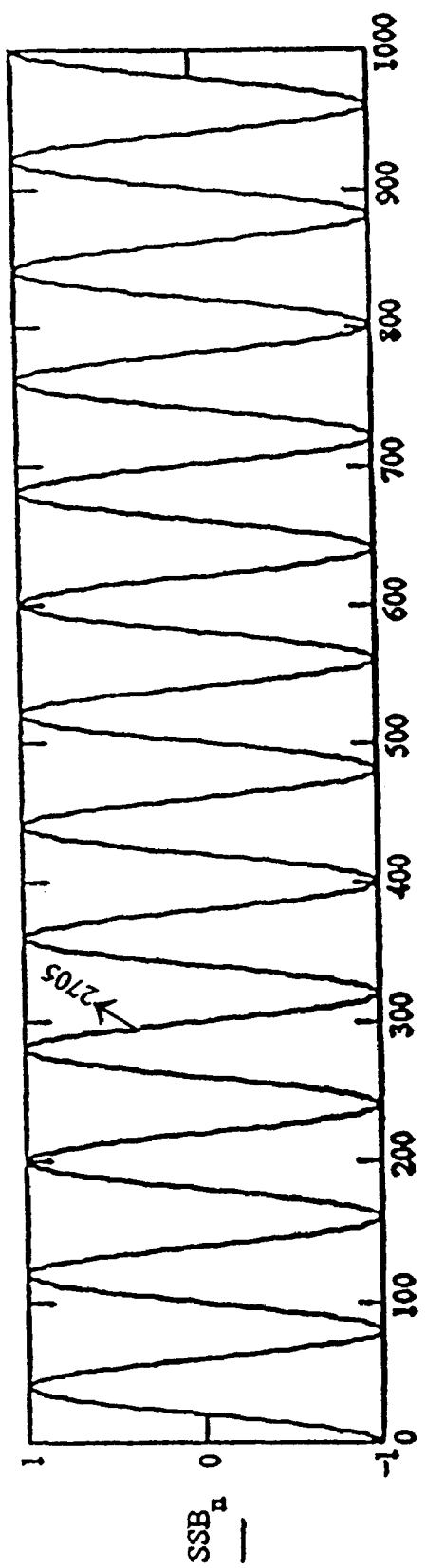
FIG. 27 depicts the SSB modulation for the example waveforms.

The waveform 2705 on FIG. 27 was obtained by subtracting the example waveform 2605 on FIG. 26 from the example waveform 2505 on FIG. 25. The waveform 2705 on FIG. 27 should be at a frequency of 10 Hz from the carrier on FIG. 25 plus the 2.5-Hz frequency from the Doppler signal on FIG. 26. The waveform 2705 on FIG. 27 shows that there are 12.5 cycles where originally there were 10 cycles.

This technique is compatible with a modulation signal with either a positive or negative frequency. This is important for the chirp/Doppler IF generator for accurate Doppler simulation and for accurate modulation by the waveform generator. Doppler shift is positive (higher frequency) for inbound targets and negative (lower frequency) for outbound targets. The baseband signal from the waveform generator actually represents a sweep from a negative to a positive frequency.

With an in phase and a quadrature signal available, a negative frequency is represented by inverting the in phase component and keeping the quadrature component the same. Use of the sine and cosine lookup tables in the Doppler signal generator, and using sine and cosine functions in the waveform generator assures that this inversion of the in phase signal is present for negative frequencies.

Figure 28:
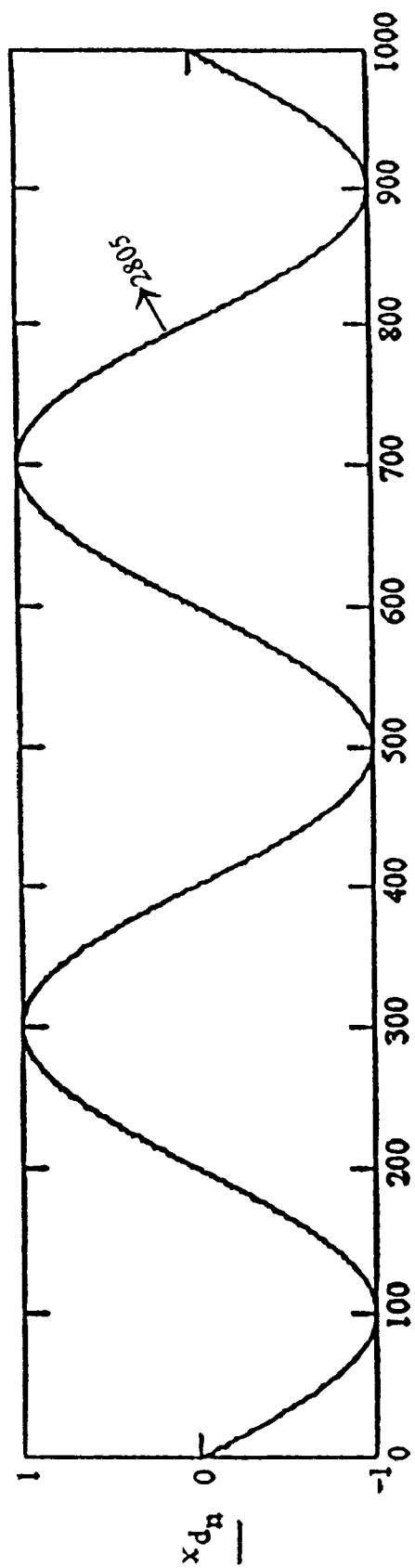
FIG. 28 is an example of a Doppler signal with a negative frequency.

FIG. 28 illustrates the example waveform 2805. This is the same Doppler signal that was shown on FIG. 24 but with a frequency of −2.5 Hz. As can be seen by comparing the waveform 2405 on FIG. 24 with the waveform 2805 on FIG. 28, the only difference is that the signal 2805 on FIG. 28 is inverted compared to the signal 2405 on FIG. 24.

Figure 29:
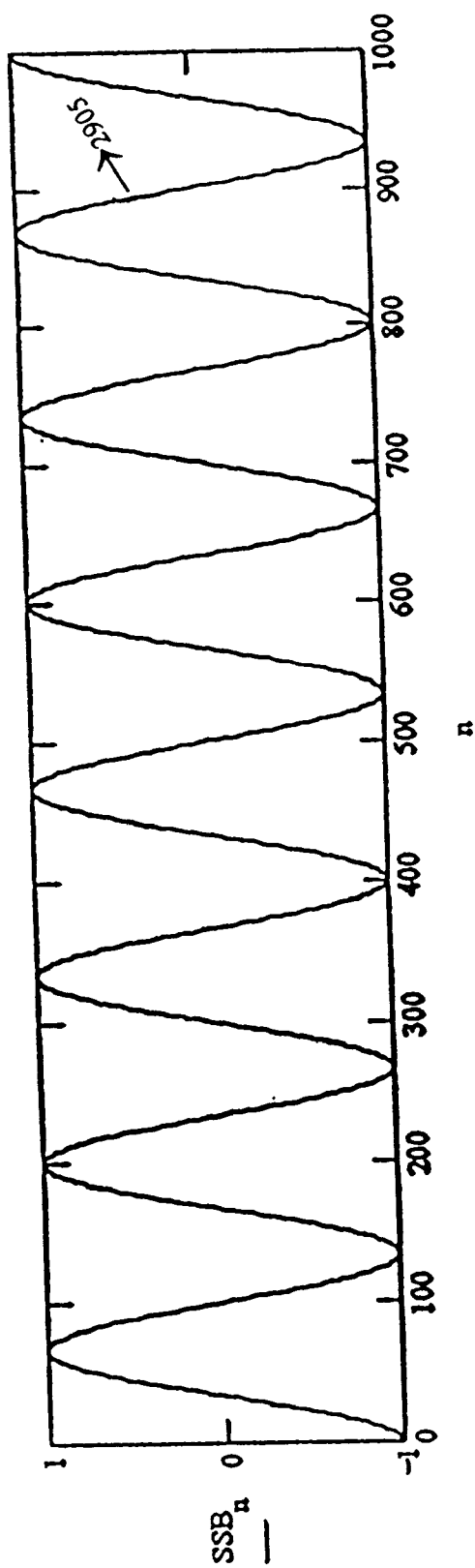
FIG. 29 shows SSB modulation with a negative frequency Doppler signal.

The signal 2905 on FIG. 29 represents the output of the SSB modulation of the carrier signal on FIG. 23 with the one on FIG. 28. In this case, the expected frequency of the waveform 2905 on FIG. 29 is 10 Hz minus 2.5 Hz (i.e., 7.5 Hz) because the frequency of the modulating waveform is negative. Examination of the waveform 2905 on FIG. 29 shows that there are indeed 7.5 cycles where there should be.

This technique is called phase-shift SSB modulation because it relies on the availability of both the in phase and the phase shifted quadrature signals. Accurate analog phase shifts are difficult to produce reliably, making this type of modulator difficult to build with analog components.

Phase shifts, however, are simple with digital signals. The in phase signal is developed using a sine lookup table, and the quadrature signal is developed using a cosine lookup table.

Figure 30:
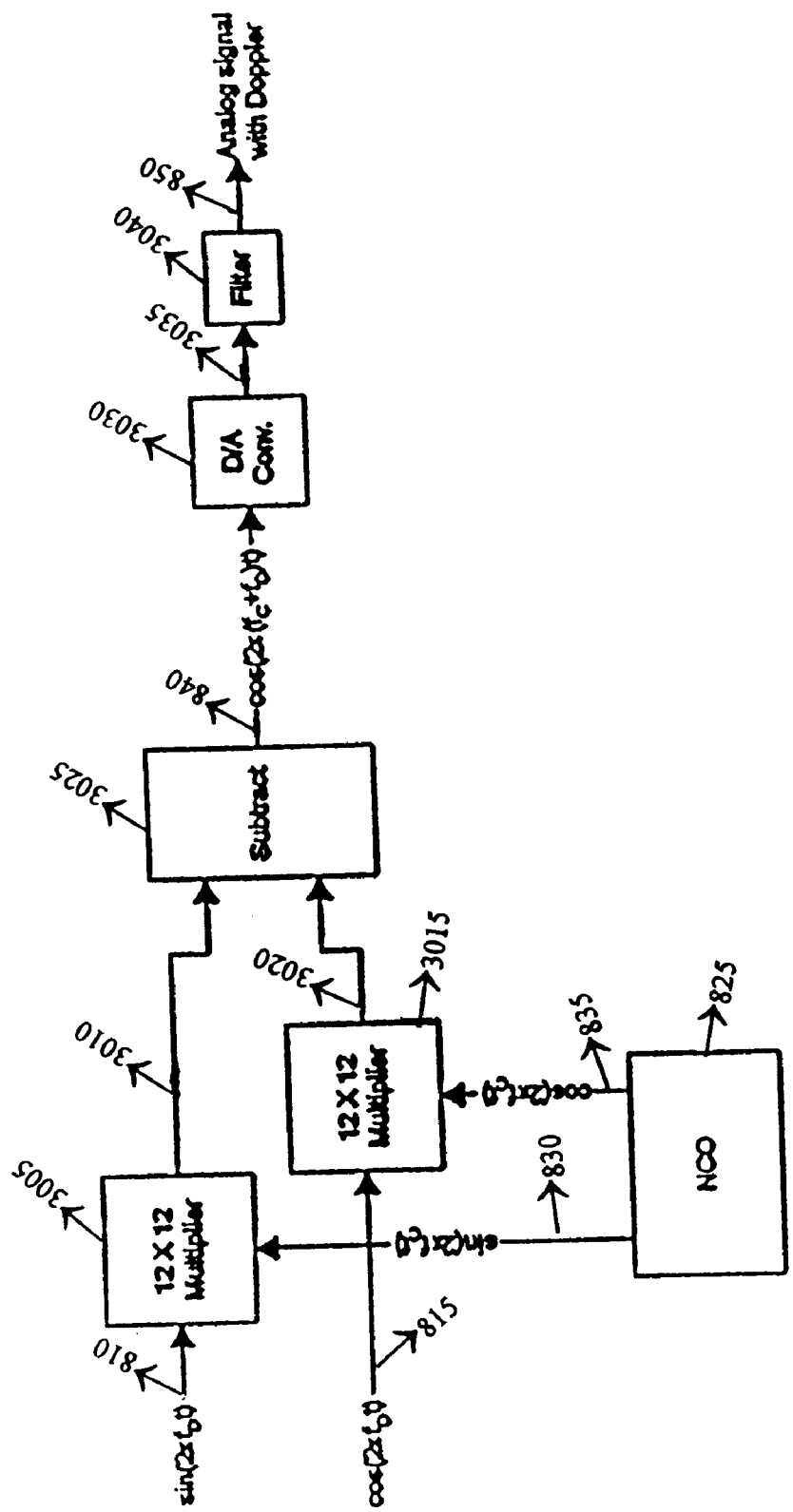
FIG. 30 depicts the design of the QAM.

On the chirp/Doppler IF generator, this modulation is performed digitally inside a QAM integrated circuit 820, and the carrier is digitally synthesized in an NCO integrated circuit 825. The NCO 825 provides both in phase and quadrature versions of the carrier to the QAM, and the Doppler generator provides both I and Q versions of the Doppler signal to the QAM. The QAM function consists of the two multipliers 3005 and 3015 and the subtractor 3025 shown on FIG. 30. The output 3010 and 3020 of both multipliers 3005 and 3015 are accepted by the subtractor 3025. The combination of the D/A converter 3030 and the filter 3040 on FIG. 30 is the same as the combination 845 as shown on FIG. 8. The output 3035 of the D/A converter 3030 is accepted by the lowpass filter 3040. On the chirp/Doppler IF generator, the QAM 820 is implemented in one commercial integrated circuit and the NCO 825 is implemented in another. The commercial NCO operates on the same principal as the Doppler signal generators used on the chirp/Doppler IF generator, but at much higher frequencies.

The final step in the SSB modulator is to convert the digital signal from the QAM to analog for additional processing on the card. This function is performed in a high-speed commercial D/A converter and a lowpass analog filter. The analog signal from the D/A is a carrier signal at the frequency programmed into the NCO with the modulations from the Doppler signal generator or the waveform generator. This signal also contains undesired high frequency components that are an artifact of the digital signal processing; thus, a lowpass filter 3040 is included to remove these components.

Chirp/Doppler Up-Convert

The chirp/Doppler up-convert section 900 of the chirp/Doppler IF generator translates the signal 850 from the SSB modulator up to equal the IF frequency of the radar being stimulated.

The frequency translation of the signal occurs in an analog mixer 905 using a programmable local oscillator. The local oscillator signal 327 is developed in an Analog Devices NCO 385 that includes a built-in D/A converter, the AD9850. The AD9850 is rated for clock frequencies up to 120 MHz, which enables this part to produce high fidelity signals up to 35 MHz. The output 390 of the NCO 385 is passed through a filter 395. The output 303 of the filter 395 is passed through a frequency doubler 307, effectively doubling the maximum frequency available to 70 MHz.

The signal from the NCO is programmed so that the output 313 from the doubler is at a frequency that is equal to the radar IF frequency plus the frequency of the signal from the SSB modulator. The signal 313 is split by the splitter 317 and used by both the up-converter 900 and the ECM 1000. The mixer 905 is a double balanced type mixer that is optimized to provide a signal at its output with a frequency equal to the difference between the two input signals.

At this point, the signal is at the radar IF frequency and it contains all of the artifacts of the simulation except for the effects of jamming. The output maintains coherency with the radar COHO because the system clock for the chirp/Doppler IF generator is phase locked to the radar COHO. The mixer output 910 is sent to an analog adder 380 where the effects of simulated jamming are added before the signal 333 is sent off of the board.

Chirp/Doppler Electronic CounterMeasures (ECM)

The ECM unit 1000 is programmed with two parameters from the software; frequency 370 and pulse pattern 375. Frequency 370 is used to set the output frequency of the Analog Devices 9859 NCO 1005 to a value equal to the radar IF frequency plus the frequency of the reference oscillator signal 323. The output from the NCO 1010 is passed through a filter 1015 to remove image frequency components. The output from the filter 1020 is passed to a mixer 1025 where it is mixed with the reference oscillator signal 323. The frequency of the output from the mixer 1030 is the difference between the frequency of the reference oscillator signal 323 and the signal from the filter 1020 and equal to the frequency of the radar's IF. The output from the mixer 1030 is used as the carrier signal for the simulated jamming signal.

The output from the mixer 1030 is passed to a digital attenuator 1035. The digital attenuator 1035 is used to modulate the carrier signal 1030 with a pulse train 1040 coming from the ECM Pulse Generator 1075. The ECM Pulse Generator 1075 is programmed in real time by the software 375 to create a signal that represents the effect of the simulated jammer on the radar being stimulated.

The output from the digital attenuator 1050 is then divided into two equal signals in the splitter 1055. One of these signals 1060 is sent to a 10 dB attenuator 1080 and the other 1065 is sent to one input of a double throw double pole RF switch 1095. The attenuated signal 1070 is sent to the other input of the double throw double pole RF switch 1095. One of the outputs from the double throw double pole RF switch 1085 is added to the main channel IF stimulation signal in an adder 380 and the other 1090 is used as the simulated CSLC signal.

The double throw double pole RF switch 1095 control signal 1077 comes from the ECM Pulse Generator 1075. This signal 1077 is set by the software to send the attenuated jamming signal 1070 to the CSLC channel 1090 and the un-attenuated signal 1065 to the main channel 1085 when the simulated jammer is in the radar antenna main lobe. This signal 1077 is set to send the attenuated jamming signal 1070 to the main channel 1085 and the un-attenuated signal 1065 to the CSLC channel 1090 when the simulated jammer is in one of the the radar antenna side lobes.

The signal generation portion of the ECM section is a pulse generator that is directly controlled by the DRLMS. The pulse generator is programmed in real time with data that causes the pulse generator to produce a pulse pattern that is characteristic of the type of jammer selected and the radar parameters. For example, a swept FM-type jammer is modeled in the GNSS by calculating the percentage of time the swept signal is in the radar passband, then creating a pulse train that reflects that duty cycle.

The ECM section has two IF sources available, one that is coherent with the radar COHO and one that is not. One of these sources is selected based upon jammer type CSLC is a feature designed into some radars that helps the radar eliminate jammers that are not in the radar antenna main beam. CSLC processors work by comparing the strength of signals from the main, directional radar antenna with signals from omnidirectional antennas. If the signal is stronger in the omnidirectional channel than in the main antenna, the radar assumes that the signal is coming from a source that is in the radar sidelobes and the signal is canceled. All signals that are stronger in the main channel are not canceled and are passed through without any processing.

Different radars have different names for the omnidirectional channels. In most cases, the antennas are not truly omnidirectional; rather, they have a beamwidth that it wide compared to the main antenna beamwidth. Some radars also have more than one of these channels. The MK 23 TAS, for example, has two of these channels (one called the sidelobe channel, and one called the auxiliary (aux) channel) even though they are both processed in the same way. Despite these differences, all of the radars function more or less the same.

TABLE III

| CSLC Channels | |
|---|---|
| Radar | CSLC |
| AN/SPS-40 | 0 |
| Radar | 2 |
| AN/SPS-49 | 4 |

The data in Table III shows how many CSLC channels are built into each radar that is supported by the chirp/Doppler IF generator. Because radars with multiple CSLC channels process them all in the same way, the GNSS develops only one simulated CSLC signal that is injected into all of the CSLC channels on the radar. This technique has been used successfully on Device 20134 with the AN/SPS-49, MK 23 TAS, AN/SPS-48C, MK 95, and other radars that are not in the GNSS requirement.

The CSLC simulation on the chirp/Doppler IF generator acknowledges the manner in which these signal are used. When the DRLMS programs the ECM signal on the chirp/Doppler IF generator, it also passes a data bit to the chirp/Doppler IF generator that indicates whether or not the jammer is in the main beam of the radar. If the simulated jammer is in the main beam, the stronger of the two otherwise identical simulated jamming signals is sent into the main channel and the weaker one is sent to the CSLC channels. If the simulated jammer is not in the main beam, the stronger signal is sent to the CSLC channels.

With this stimulation algorithm, the CSLC processors in the radar perform their function as they would with real jamming signals.

While preferred embodiments of the present invention have been shown and described, it will be appreciated by those skilled in the art that modifications and changes may be made without departing from the spirit of the present invention.

What I claim is:

1. Apparatus for generating stimulation signals for a pulse radar at an intermediate frequency (IF), thereof, the radar including a receiver, comprising:

digital means for generating a plurality of simulated surface acoustic waveforms;

phase locked looped means for providing a timing signal to the receiver; and first circuit means responsive to said timing means for generating a plurality of modulated synthesized signals.

2. The apparatus according to claim 1, wherein said plurality of modulated synthesized signals are selected from the group consisting of time-overlapping chirp waveforms and Doppler shifted waveforms.

3. The apparatus according to claim 2, wherein said plurality of modulated synthesized signals each comprise time-overlapping chirp waveforns.

4. The apparatus according to claim 3, wherein said time-overlapping chirp waveforms comprise a waveform defined by the equation $Z(t)=A_C A_B \cos 2\pi t(f_C+f_B(t/PW-1))$, where $A_C$ is the arbitrary amplitude of the carrier signal, $A_B$ is the amplitude of the synthesized time-overlapping chirp waveform, $f_C$ is the frequency of the carrier signal, $f_B$ is the frequency of the time-overlapping chirp waveform, PW is the pulse width of the time-overlapping chirp waveform, and t is time.

5. The apparatus according to claim 2, wherein said plurality of modulated synthesized signals each comprise Doppler shifted waveforms.

6. The apparatus according to claim 5, wherein said Doppler shifted waveforms comprise a waveform defined by the equation $Z(t)=A_C A_D \cos 2\pi t(f_C+f_D)t$, where $A_C$ is the arbitrary amplitude of the carrier signal, $A_D$ is the amplitude of the Doppler shifted waveform, $f_C$ is the frequency of the carrier signal, $f_D$ is the frequency of the Doppler shifted waveform, and t is time.

7. The apparatus according to claim 1, further comprising:

second circuit means for generating a jamming signal; and adder means for inserting effects of said jamming signal into said modulated synthesized signals.

8. Apparatus for generating stimulation signals for a pulse radar at an intermediate frequency (IF), thereof, the radar including a receiver, comprising:

digital means for generating a plurality of simulated surface acoustic waveforms;

phase locked looped means for providing a timing signal to the receiver;

first means responsive to said timing means for synthesizing a time-overlapping chirp waveform;

second means responsive to said timing means for synthesizing a Doppler shifted waveform;

means for selecting one of said waveforms;

third means responsive to said timing means for modulating said selected waveform;

fourth means for filleting said selected modulated synthesized waveform to retrieve a portion thereof; and mixing means for translating said selected portion of said waveform to said IF.

9. The apparatus according to claim 8, wherein said third means for modulating said selected waveform, further comprises single sideband modulation.

10. The apparatus according to claim 8, wherein said fourth means for filtering said selected modulated synthesized waveform to retrieve a portion thereof, further comprises retrieving upper sideband of said selected modulated synthesized waveform only.

11. The apparatus according to claim 8, further comprising:

fifth circuit means for generating a jamming signal; and adder means for inserting effects of said jamming signal into said modulated synthesized waveforms.

12. Apparatus for generating stimulation signals for a pulse radar at an intermediate frequency (IF), thereof, the radar including a receiver, comprising:

means for accepting radar mode data for producing decision signals;

timing means phase locked looped to said receiver;

range bins containing data for a single radar sweep where each said range bin is equal to resolution of said radar;

means responsive to said timing means for accessing a set of addresses that sequence through all of said range bins at a rate defined by the size of said range bin;

memory means responsive to said decision signals and said timing means;

first synthesis means responsive to said timing means and said decision signals for producing time-overlapping chirp waveforms;

second synthesis means responsive to said timing means for producing a Doppler shifted waveforms;

means responsive to said decision signals for selecting a waveform from a group consisting of said time-overlapping chirp waveforms and said Doppler shifted waveforms;

means responsive to said timing means for modulating said selected waveform;

means responsive to said timing means for filtering said modulated selected waveform to retrieve a portion thereof; and means responsive to said timing means for translating said portion of said selected waveform to said LF of said receiver.

13. The apparatus according to claim 12, wherein said means for modulating said selected waveform, further comprises single sideband modulation.

14. The apparatus according to claim 12, wherein said means for filtering said modulated selected waveform to retrieve a portion thereof, further comprises retrieving upper sideband of said selected modulated waveform only.

15. The apparatus according to claim 12, wherein said means for accepting radar mode data for producing decision signals, further comprises:

means for accepting antenna motion signals;

means for accepting a radar mode signal; and means for generating decision signals from said antenna motion signals and said radar mode signal.

16. The apparatus according to claim 15, wherein said means responsive to said timing means for accessing a set of addresses that sequence through all of said range bins at a rate defined by the size of said range bin, further comprises:

a plurality of range counters for generating simulated target data:

means for cycling said timing means from one said range counter to the next; and means to time-multiplex output of said plurality of said range counters onto a single address bus.

17. The apparatus according to claim 16, wherein said range counters are independent.

18. The apparatus according to claim 16, wherein said memory means responsive to said decision signals and said timing means, further comprises:

means for accepting said decision signals;

means for accepting said simulated target data;

buffered memory responsive to said timing means for storing said simulated target data;

second memory for storing range attenuation data representing the effects of distance on said simulated target data; and means responsive to said timing means for generating signal strength data from said simulated target data and from said range attenuation data.

19. The apparatus according to claim 18, wherein said first synthesis means responsive to said timing means and said decision signals for producing time-overlapping chirp waveforms, further comprises:

means for accepting said decision signals;

means for accepting said signal strength data;

means responsive to said timing means for adding phase shift to said simulated target data;

means for summing said plurality of time-multiplexed signal strength data;

means responsive to said timing means using finite impulse response process chips for generating an impulse representation of said summed signal strength data;

means responsive to said timing means for generating in phase signal component of said impulse representation;

means responsive to said timing means for generating quadrature component of said impulse representation; and means responsive to said timing means for increasing sampling rate of said in phase and quadrature components.

20. The apparatus according to claim 19, wherein said second synthesis means responsive to said timing means for producing a Doppler shifted waveforms, further comprises:

means for accepting said decision signals;

means for accepting said signal strength data;

means responsive to said timing means and said decision means for generate phase component of said signal strength data; and means responsive to said timing means and said decision means for generating quadrature component of said signal strength data.

21. The apparatus according to claim 20, wherein said means responsive to said timing means for modulating said selected waveform, further comprises:

means responsive to said timing means for generating a synthesized carrier signal;

means responsive to said timing means for producing phase-shifted modulated synthesized radar target signal data using said synthesized carrier signal and said selected synthesized waveform;

means responsive to said timing means for transforming said phase-shifted modulated synthesized radar target signal to an analog signal; and means responsive to said timing means for eliminating high frequency component from said analog signal.

22. The apparatus according to claim 21, wherein said means responsive to said timing means for filtering said modulated selected waveform to retrieve a portion thereof, further comprises:

means for accepting a frequency signal;

means for accepting said analog signal; and means for subtracting said frequency signal from said analog signal.

23. The apparatus according to claim 12, further comprising:

means responsive to said decision signals for generating a jamming signal; and means for inserting effects of said jamming signal into said retrieved portion of said selected modulated waveform.

24. Method for generating stimulation signals for a pulse radar at an intermediate frequency (IF), thereof, the radar including a receiver, comprising the steps of:

generating a plurality of simulated surface acoustic waveforms;

providing a phased locked looped timing signal to the receiver; and generating a plurality of modulated synthesized signals responsive to said timing signal.

25. The method according to claim 24, further comprising the step of selecting modulated synthesized signals from the group consisting of time-overlapping chirp waveforms and Doppler shifted waveforms.

26. The method according to claim 25, wherein said selected modulated synthesized signals each comprise time-overlapping chirp waveforms.

27. The method according to claim 26, wherein said time-overlapping chirp waveforms comprise a waveform defined by the equation $Z(t)=A_C A_B \cos 2\pi t(f_C+f_B(t/PW-1))$, where $A_C$ is the arbitrary amplitude of the carrier signal, $A_B$ is the amplitude of the synthesized time-overlapping chirp waveform, $f_C$ is the frequency of the carrier signal, $f_B$ is the frequency of the time-overlapping chirp waveform, PW is the pulse width of the time-overlapping chirp waveform, and t is time.

28. The method according to claim 27, wherein said plurality of modulated synthesized signals each comprise Doppler shifted waveforms.

29. The method according to claim 28, wherein said Doppler shifted waveforms comprise a waveform defined by the equation $Z(t)=A_C A_D \cos 2\pi t(f_C+f_D)t$, where $A_C$ is the arbitrary amplitude of the carrier signal, $A_D$ is the amplitude of the Doppler shifted waveform, $f_C$ is the frequency of the carrier signal, $f_D$ is the frequency of the Doppler shifted waveform, and t is time.

30. The method according to claim 24, further comprising the steps of:

generating a jamming signal; and inserting effects of said jamming signal into said modulated synthesized signals.

31. Method for generating stimulation signals for a pulse radar at an intermediate frequency (IF), thereof, the radar including a receiver, comprising the steps of:

generating plurality of simulated surface acoustic waveforms;

providing a phase locked looped timing signal to the receiver;

synthesizing a time-overlapping chirp waveform responsive to said timing signal;

synthesizing a Doppler shifted waveform responsive to said timing signal;

selecting one of said waveforms, modulating said selected waveform responsive to said timing signal;

filtering said selected modulated synthesized waveform to retrieve a portion thereof; and translating said selected portion of said waveform to said IF.

32. The method according to claim 31, wherein said modulating step of said selected waveform, further comprises the step of single sideband modulating.

33. The method according to claim 31, wherein said filtering step of said selected modulated synthesized waveform to retrieve a portion thereof, further comprises the step of retrieving the upper sideband of said selected modulated synthesized waveform only.

34. The method according to claim 31, further comprising the steps of:

generating ajamming signal; and inserting effects of said jamming signal into said modulated synthesized waveforms.

35. Method for generating stimulation signals for a pulse radar at an intermediate frequency (IF), thereof, the radar including a receiver, comprising the steps of:

accepting radar mode data for producing decision signals;

generating a phase locked looped timing signal for said receiver, accessing a set of addresses that sequence through all range bins containing data for a single radar sweep where each said range bin is equal to resolution of said radar at a rate defined by the size of said range bin;

generating signal strength data from simulated target data and range attenuation data;

synthesizing time-overlapping chirp waveforms responsive to said timing signal and said decision signals;

synthesizing Doppler shifted waveforms responsive to said timing signal;

selecting a waveform from a group consisting of said time-overlapping chirp waveforms and said Doppler shifted waveforms responsive to said decision signals:

modulating said selected waveform responsive to said timing signal;

filtering said modulated selected waveform to retrieve a portion thereof responsive to said timing signal; and translating said portion of said selected waveform to said IF of said receiver responsive to said timing signal.

36. The method according to claim 35, wherein said modulating step, further comprises the step of single sideband modulating.

37. The method according to claim 35, wherein said filtering step of said modulated selected waveform to retrieve a portion thereof, further comprises the step of retrieving upper sideband of said selected modulated waveform only.

38. The method according to claim 35, wherein said accepting step for radar mode data for producing decision signals, further comprise the steps of:

accepting antenna motion signals;

accepting a radar mode signal; and generating decision signals from said antenna motion signals and said radar mode signal.

39. The method according to claim 38, wherein said accessing step, further comprises the steps of:

generating simulated target data using a plurality of range counters:

cycling, said timing signals from one said range counter to the next; and time-multiplexing output of said plurality of said range counters onto a single address bus.

40. The method according to claim 39, wherein said range counters are independent.

41. The method according to claim 40 wherein said generating signal strength data from simulated target data and range attenuation data step responsive to said timing signals and said decision signals, further comprises the steps of:

accepting said decision signals;

accepting said simulated target data;

storing said simulated target data in buffered memory responsive to said timing signals; and storing, range attenuation data in a second memory representing the effects of distance on said simulated target data.

42. The method according to claim 41, wherein said synthesizing step responsive to said timing means and said decision signals for producing time-overlapping chirp waveforms, further comprises the steps of:

accepting said decision signals;

accepting said signal strength data;

adding phase shift to said simulated target data responsive to said timing signals, summing said plurality of time-multiplexed signal strength data;

using finite impulse response processing chips responsive to said timing signals for generating an impulse representation of said summed signal strength data;

generating in phase signal component of said impulse representation responsive to said timing signals;

generating quadrature signal component of said impulse representation responsive to said timing signals; and increasing sampling rate, responsive to said timing signals, of said in phase and quadrature components.

43. The method according to claim 42, wherein said synthesizing step responsive to said timing means for producing a Doppler shifted waveforms, further comprises the steps of:

accepting said decision signals;

accepting said signal strength data;

generating in phase component of said signal strength data responsive to said timing signals and said decision signals; and generating quadrature component of said signal strength data responsive to said timing signals and said decision signals.

44. The method according to claim 43, wherein said modulating step of said selected waveform responsive to said timing signals, further comprises the steps of:

generating a synthesized carrier signal responsive to said timing signals;

producing phase-shifted modulated synthesized radar target signal data using said synthesized carrier signal and said selected synthesized waveform responsive to said timing signals;

transforming said phase-shifted modulated synthesized radar target signal to an analog signal responsive to aid timing signals; and eliminating high frequency component from said analog signal responsive to said timing signals.

45. The method according to claim 35, further comprising the steps of:

generating a jamming signal responsive to said decision signals; and inserting effects of said jamming signal into said upper sideband of said selected modulated waveform.

* * * * *